US010684367B2

(12) United States Patent
Yoo et al.

(10) Patent No.: US 10,684,367 B2
(45) Date of Patent: Jun. 16, 2020

(54) ULTRASOUND SENSOR AND OBJECT DETECTING METHOD THEREOF

(71) Applicant: SAMSUNG ELECTRONICS CO., LTD., Suwon-si, Gyeonggi-do (KR)

(72) Inventors: Jae-hyeon Yoo, Yongin-si (KR); Sung-do Choi, Suwon-si (KR); Moon-sik Jeong, Seongnam-si (KR); Hyun-soo Choi, Seoul (KR)

(73) Assignee: SAMSUNG ELECTRONICS CO., LTD., Suwon-si, Gyeonggi-do (KR)

(*) Notice: Subject to any disclaimer, the term of this patent is extended or adjusted under 35 U.S.C. 154(b) by 201 days.

(21) Appl. No.: 15/528,254

(22) PCT Filed: Jun. 17, 2015

(86) PCT No.: PCT/KR2015/006116
§ 371 (c)(1),
(2) Date: May 19, 2017

(87) PCT Pub. No.: WO2016/085073
PCT Pub. Date: Jun. 2, 2016

(65) Prior Publication Data
US 2017/0329004 A1 Nov. 16, 2017

(30) Foreign Application Priority Data
Nov. 26, 2014 (KR) .................. 10-2014-0166625

(51) Int. Cl.
G09G 5/00 (2006.01)
G01S 15/04 (2006.01)
(Continued)

(52) U.S. Cl.
CPC .......... G01S 15/04 (2013.01); G01S 7/52003 (2013.01); G01S 7/524 (2013.01); G01S 7/526 (2013.01);
(Continued)

(58) Field of Classification Search
CPC ...... G01S 15/04; G01S 7/52003; G01S 7/524; G01S 7/526
(Continued)

(56) References Cited

U.S. PATENT DOCUMENTS 7,821,872 B2 10/2010 Okuda
8,169,404 B1 5/2012 Boillot
(Continued)

FOREIGN PATENT DOCUMENTS

CN 103797379 5/2014
CN 103858073 6/2014
(Continued)

OTHER PUBLICATIONS

Extended European Search Report dated Nov. 3, 2017 for counterpart EP Application No. 15862519.4.
(Continued)

Primary Examiner — Jonathan M Blancha
(74) Attorney, Agent, or Firm — Nixon & Vanderhye, P.C.

(57) ABSTRACT

Provided are a low-power ultrasound sensor that detects whether an object exists at a high speed, an object detecting method of the ultrasound sensor, and a computer-readable storage medium. The ultrasound sensor may include: a transmitter that outputs a plurality of first ultrasound beams having different frequencies; a receiver that receives a first reflection signal that is output when the output plurality of first ultrasound beams are reflected from an object; and a controller that determines a first area in a space, controls the transmitter to respectively output the plurality of first ultrasound beams to a plurality of first sub-areas that are included in the first area, and determines whether the object is included in each of the plurality of first sub-areas, based on the first reflection signal.

20 Claims, 34 Drawing Sheets

(51) Int. Cl.
   *G01S 7/52*    (2006.01)
   *G01S 7/526*   (2006.01)
   *G01S 15/10*   (2006.01)
   *G01S 15/42*   (2006.01)
   *G01S 15/50*   (2006.01)
   *G01S 15/89*   (2006.01)
   *G01S 7/524*   (2006.01)
   *G10K 11/34*   (2006.01)
   *G06F 3/01*    (2006.01)

(52) U.S. Cl.
   CPC .............. *G01S 15/10* (2013.01); *G01S 15/42* (2013.01); *G01S 15/50* (2013.01); *G01S 15/89* (2013.01); *G06F 3/011* (2013.01); *G06F 3/017* (2013.01); *G10K 11/346* (2013.01)

(58) Field of Classification Search
   USPC ........................................................... 345/8
   See application file for complete search history.

(56) References Cited

U.S. PATENT DOCUMENTS

| | | | |
|---|---|---|---|
| 8,248,298 | B2 | 8/2012 | Lalezari |
| 8,471,868 | B1 | 6/2013 | Wilson et al. |
| 2006/0196272 | A1 | 9/2006 | Sugiura et al. |
| 2007/0229479 | A1* | 10/2007 | Choo .................. G06F 3/0436 345/177 |
| 2007/0288194 | A1* | 12/2007 | Boillot .................. G06F 3/0304 702/150 |
| 2010/0095206 | A1* | 4/2010 | Kim ...................... G06F 3/017 715/702 |
| 2010/0141527 | A1 | 6/2010 | Lalezari |
| 2011/0041100 | A1* | 2/2011 | Boillot .................. G06F 3/011 715/863 |
| 2011/0148798 | A1 | 6/2011 | Dahl |
| 2012/0095335 | A1* | 4/2012 | Sverdlik ............ A61B 17/2202 600/439 |
| 2012/0133585 | A1* | 5/2012 | Han ...................... G06F 3/017 345/158 |
| 2013/0120736 | A1 | 5/2013 | Bosse et al. |
| 2014/0198619 | A1* | 7/2014 | Lamb .................... G01S 15/42 367/99 |
| 2014/0359757 | A1* | 12/2014 | Sezan .................... G06F 21/32 726/19 |
| 2014/0361988 | A1 | 12/2014 | Katz et al. |
| 2017/0052599 | A1 | 2/2017 | Katz et al. |

FOREIGN PATENT DOCUMENTS

| | | |
|---|---|---|
| JP | 63-138287 | 6/1988 |
| JP | 2009-058362 | 3/2009 |
| JP | 2010-218365 | 9/2010 |
| JP | 2011-522271 | 7/2011 |
| JP | 2014-106698 | 6/2014 |
| KR | 10-2014-0069124 | 6/2014 |
| WO | 2013/042021 | 3/2013 |

OTHER PUBLICATIONS

Office Action dated Apr. 22, 2019 in Chinese Patent Application No. 201580064571.4 and English-language machine translation.
Office Action dated May 21, 2019 in Japanese Patent Application No. 2017-528190 and English-language machine translation.
Office Action dated Jun. 25, 2019 in Korean Patent Application No. 10-2014-0166625 and English-language machine translation.
Tabata, Katsuhiko et al., "New Navigation System for Automatic Guided Vehicles Using an Ultrasound Sensor Array," Transactions of the Society of Instrument and Control Engineers, Japan, Jan. 31, 2012, vol. 48, No. 1, pp. 11-19, ISSN 0453-4654.
International Search Report for PCT/KR2015/006116 dated Sep. 25, 2015, 3 pages.
Written Opinion of the ISA for PCT/KR2015/006116 dated Sep. 25, 2015, 8 pages.
[Online], Master Theorom, http://ko.wikipedia.org/wiki/%EB%A7%88%EC%8A%A4%ED%84%B0_%EC%A0%95%EB%A6%AC, retrieved May 8, 2017, 1 page.
[Online], http://techneedle.com/wp-content/uploads/2013/05/google-glass.png, 1 page.
Notification of Second Office Action dated Dec. 30, 2019 in Chinese Patent Application No. 201580064571.4 and English-language machine translation.

\* cited by examiner

ULTRASOUND SENSOR AND OBJECT DETECTING METHOD THEREOF

RELATED APPLICATION

This application is the U.S. national phase of International Application No. PCT/KR2015/006116 filed on Jun. 17, 2015 which designated the U.S. and claims the benefit of Korean Patent Application No. 10-2014-0166625, filed on Nov. 26, 2014, in the Korean Intellectual Property Office, the entire contents of each of which are hereby incorporated by reference.

BACKGROUND

1. Field

One or more exemplary embodiments relate to an ultrasound sensor, an object detecting method thereof, and a computer-readable storage medium, and more particularly, to an ultrasound sensor for relatively rapidly and accurately detecting an object and an object detecting method of the ultrasound sensor.

2. Description of the Related Art

An ultrasound sensor obtains information about a position and a distance of an object by applying an ultrasound signal that is generated from a transmitter to the object and receiving information of a reflection signal that is reflected from the object.

The transmitter of the ultrasound sensor may include a plurality of output elements. The plurality of output elements output ultrasound and the ultrasound is reflected in a space where a density is changed. For example, ultrasound with frequencies that range from several kHz to hundreds of MHz is transmitted from the plurality of output elements to the object and then is reflected from the object. The reflected ultrasound vibrates a plurality of input elements of a receiver and thus the plurality of input elements output electrical pulses. The electrical pulses are used to detect a solid body.

Recently, ultrasound sensors output a focused ultrasound beam by switching or steering ultrasound beams by using an arrangement of a plurality of output elements. When the plurality of output elements are linearly arranged, the ultrasound beams may be switched or steered in a direction in which the plurality of output elements are arranged. Also, when the plurality of input elements are arranged in a direction that is different from the direction in which the plurality of output elements are arranged, an object may be three-dimensionally detected. Accordingly, ultrasound sensors that detect an object in a three-dimensional (3D) space as well as a two-dimensional (2D) space have been introduced.

SUMMARY

An ultrasound sensor performs a full scan on an entire area that may be scanned by the ultrasound sensors in order to uniformly detect objects at a high resolution. In this case, even when sizes of the objects are different from one another, since the same amount of data processing is required in order to detect the objects, a speed at which the objects are detected is reduced. Also, since steering has to be performed in order for an ultrasound beam to reach the entire area during the full scan, power consumption is high.

Also, when an ultrasound sensor simultaneously outputs a plurality of ultrasound beams in order to scan a plurality of areas, the plurality ultrasound beams may interfere with one another. Accordingly, the ultrasound sensor has to output one ultrasound beam to one area and receive a signal that is reflected from an object, and then has to output another ultrasound beam to another area and receive a signal that is reflected from the object. That is, since the ultrasound sensor may scan only one area at one time, when a plurality of areas are to be scanned, it takes a long time.

One or more exemplary embodiments include a low-power ultrasound sensor that detects whether an object exists at a high speed, an object detecting method of the ultrasound sensor, and a computer-readable storage medium.

Additional aspects will be set forth in part in the description which follows and, in part, will be apparent from the description, or may be learned by practice of the presented exemplary embodiments.

According to one or more exemplary embodiments, an ultrasound sensor includes: a transmitter outputting a plurality of first ultrasound beams having different frequencies; a receiver receiving a first reflection signal that is output when the output plurality of first ultrasound beams are reflected from an object; and a controller determining a first area in a space, controlling the transmitter to respectively output the plurality of first ultrasound beams to a plurality of first sub-areas that are included in the first area, and determining whether the object is included in each of the plurality of first sub-areas, based on the first reflection signal.

The transmitter may include a plurality of output elements and a first output element from among the plurality of output elements outputs an ultrasound beam for determining the first area, the receiver receives a reflection signal for determining the first area that is output when the ultrasound beam for determining the first area is reflected from the object, and the controller obtains a first point of the object that is the closest to the first output element, based on the reflection signal for determining the first area, and determines the first area that includes the first point.

A second output element from among the plurality of output elements may output an ultrasound beam for determining a second area, the receiver may receive a reflection signal for determining the second area that is output when the ultrasound beam for determining the second area is reflected from the object, and the controller may obtain a second point of the object that is the closest to the second output element, based on the reflection signal for determining the second area, and determine the second area that includes the second point.

The controller may control the transmitter to respectively output the plurality of first ultrasound beams to a plurality of second sub-areas that are included in the second area, and may determine whether the object is included in each of the plurality of second sub-areas, based on the first reflection signal.

The ultrasound sensor may be included in an electronic device, wherein the controller determines the first area based on a user interface (UI) that is provided by the electronic device to the space.

The controller may determine at least one from among sizes, positions, and shapes of the plurality of first sub-areas, based on the UI.

The transmitter may output a plurality of second ultrasound beams having different frequencies, the receiver may receive a plurality of second reflection signals that are output when the output plurality of second ultrasound beams are reflected from the object, and the controller may control the transmitter to respectively output the plurality of second ultrasound beams to a plurality of third sub-areas that are included in the plurality of first sub-areas, and may determine whether the object is included in each of the plurality of third sub-areas, based on the plurality of second reflection signals.

The transmitter may include a plurality of output elements, and outputs the plurality of first ultrasound beams and the plurality of second ultrasound beams by using at least some output elements from among the plurality of output elements, wherein the number of a plurality of output elements that are used to output at least one ultrasound beam from among the plurality of first ultrasound beams is less than the number of a plurality of output elements that are used to output at least one ultrasound beam from among the plurality of second ultrasound beams.

A frequency of an ultrasound beam having a highest frequency from among the plurality of first ultrasound beams may be lower than a frequency of an ultrasound beam having a highest frequency from among the plurality of second ultrasound beams.

The transmitter may include: a pulse generator that generates a plurality of pulses having different frequencies corresponding to the plurality of first ultrasound beams; a transmission delay unit that generates delayed pulses by delaying the plurality of pulses by predetermined delay times in order to determine directivities of the plurality of first ultrasound beams; and an output element array that outputs the plurality of first ultrasound beams based on the delayed pulses.

The receiver may receive the first reflection signal that is reflected from the object in response to the plurality of first ultrasound beams, divide the first reflection signal into signals according to frequencies, and sum signals having the same frequency from among the signals that are divided according to frequencies.

The first reflection signal may include a third reflection signal and a sixth reflection signal, wherein the receiver includes: an input element array including a first input element that receives the third reflection signal and a second input element that receives the sixth reflection signal; a filter unit that generates first divided signals by dividing the third reflection signal according to different frequencies and generates second divided signals by dividing the sixth reflection signal according to different frequencies; a reception delay unit that generates first delayed signals by delaying reception of the first divided signals based on frequencies of the first divided signals and generates second delayed signals by delaying reception of the second divided signals based on frequencies of the second divided signals; and a summing unit that sums signals having the same frequency from among the first delayed signals and the second delayed signals.

The transmitter may include an output element array including a plurality of output elements that vibrate according to a transmitted electrical signal transmitted thereto to generate ultrasound and are linearly arranged, and the receiver may include an input element array including a plurality of input elements that receive the first reflection signal and converts the first reflection signal into an electrical signal, and are linearly arranged, wherein the output element array and the input element array are arranged not to be parallel to each other.

The output element array and the input element array may be arranged to be perpendicular to each other.

According to one or more exemplary embodiments, an object detecting method of an ultrasound sensor may include: determining a first area in a space; respectively outputting a plurality of first ultrasound beams to a plurality of first sub-areas that are included in the first area; receiving a first reflection signal that is output when the output plurality of first ultrasound beams are reflected from an object; and determining whether the object is included in each of the plurality of first sub-areas, based on the first reflection signal.

The object detecting method may further include: outputting an ultrasound beam for determining the first area, wherein the outputting is performed by a first output element that vibrates according to an electrical signal; receiving a reflection signal for determining the first area that is output when the ultrasound beam for determining the first area is reflected from the object; obtaining a first point of the object that is the closest to the first output element, based on the reflection signal for determining the first area; and determining the first area that includes the first point.

The object detecting method may further include: outputting an ultrasound beam for determining a second area, wherein the outputting is performed by a second output element; receiving a reflection signal for determining the second area that is output when the ultrasound beam for determining the second area is reflected from the object;

obtaining a second point of the object that is the closest to the second output element, based on the reflection signal for determining the second area; and determining the second area that includes the second point.

The object detecting method may further include: respectively outputting the plurality of first ultrasound beams to a plurality of second sub-areas that are included in the second area; and determining whether the object is included in each of the plurality of second sub-areas, based on the first reflection signal.

The object detecting method may further include determining the first area based on a user interface (UI) that is provided to the space by an electronic device including the ultrasound sensor.

The object detecting method may further include determining at least one from among sizes, positions, and shapes of the plurality of first sub-areas, based on the UI.

The object detecting method may further include: respectively outputting the plurality of second ultrasound beams to a plurality of third sub-areas that are included in the plurality of first sub-areas; receiving a second reflection signal that is output when the plurality of second ultrasound beams are reflected from the object; and determining whether the object is included in each of the plurality of third sub-areas, based on the second reflection signal.

The transmitter may include a plurality of output elements, and output the plurality of first ultrasound beams and the plurality of second ultrasound beams by using at least some output elements from among the plurality of output elements, wherein the number of a plurality of output elements that are used to output at least one ultrasound beam from among the plurality of first ultrasound beams is controlled to be less than the number of a plurality of output elements that are used to output at least one ultrasound beam from among the plurality of second ultrasound beams.

The object detecting method may further include controlling a frequency of an ultrasound beam having a highest frequency from among the plurality of first ultrasound beams to be lower than a frequency of an ultrasound beam having a highest frequency from among the plurality of second ultrasound beams.

The respectively outputting of the plurality of first ultrasound beams may include: generating a plurality of pulses having different frequencies corresponding to the plurality of first ultrasound beams; generating delayed pulses by delaying the plurality of pulses by predetermined delay times in order to determine directivities of the plurality of first ultrasound beams; and outputting the plurality of first ultrasound beams based on the delayed pulses.

The object detecting method may further include: receiving the first reflection signal that is reflected from the object in response to the plurality of first ultrasound beams; dividing the first reflection signal into signals according to frequencies; and summing signals having the same frequency from among the signals that are divided according to frequencies.

The first reflection signal may include a third reflection signal and a fourth reflection signal, wherein the receiving of the first reflection signal includes receiving the third reflection signal and receiving the fourth reflection signal, the dividing of the first reflection signal includes generating first divided signals by dividing the third reflection signal according to different frequencies and generating second divided signals by dividing the fourth reflection single according to different frequencies, and the summing of the signals having the same frequency includes generating first delayed signals by delaying reception of the first divided signals based on frequencies of the first divided signals, generating second delayed signals by delaying reception of the second divided signals based on frequencies of the second divided signals, and summing signals having the same frequency from among the first delayed signals and the second delayed signals.

According to one or more exemplary embodiments, a non-transitory computer-readable recording medium has embodied thereon a program for executing the object detecting method.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Most of the terms used herein are general terms that have been widely used in the technical art to which the inventive concept pertains. However, some of the terms used herein may be created reflecting intentions of technicians in this art, precedents, or new technologies. Also, some of the terms used herein may be arbitrarily chosen by the present applicant. In this case, these terms are defined in detail below. Accordingly, the specific terms used herein should be understood based on the unique meanings thereof and the whole context of the inventive concept.

In the present specification, it should be understood that the terms, such as 'including' or 'having', are intended to indicate the existence of the elements disclosed in the specification, and are not intended to preclude the possibility that one or more other elements may exist or may be added. Also, the terms, such as 'unit' or 'module', should be understood as a unit that processes at least one function or operation and that may be embodied in a hardware manner, a software manner, or a combination of the hardware manner and the software manner.

As used herein, the term "and/or" includes any and all combinations of one or more of the associated listed items. Expressions such as "at least one of," when preceding a list of elements, modify the entire list of elements and do not modify the individual elements of the list.

An electronic device may receive an input from a user. For example, the electronic device may detect the user's specific gesture and may perform a function that is desired by the user based on the specific gesture. Also, the electronic device may include an ultrasound sensor in order to detect a gesture.

The electronic device may be a wearable device. For example, the electronic device may be an electronic watch or electronic glasses. The electronic device may receive an input from the user. In detail, the electronic device may receive an input from the user by detecting the user's gesture. The electronic device may include various sensors in order to detect the user's gesture. Examples of the various sensors that may be included in the electronic device may include an ultrasound sensor. The ultrasound sensor may be made compact and may relatively accurately detect an object.

Also, the electronic device may be an industrial robot, a domestic robot, a robot cleaner, a play ride, a toy, or a smartphone. For example, the electronic device may be a robot cleaner. The robot cleaner has to avoid an obstacle and check a state of a floor. The electronic device may include various sensors in order to avoid the obstacle or check the state of the floor. For example, the robot cleaner may include an ultrasound sensor.

Figure 1:
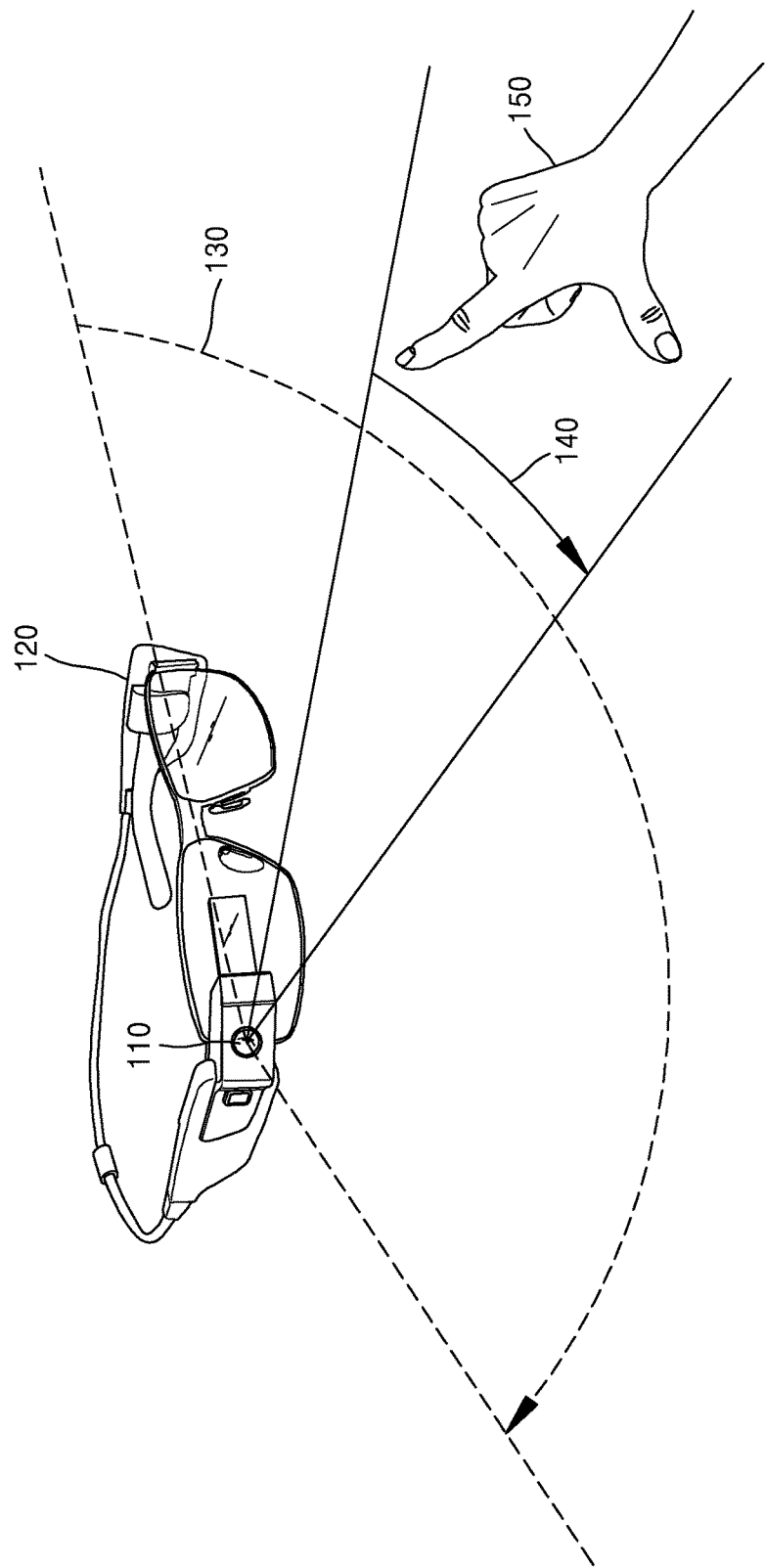
FIG. 1 is a view for explaining a use of an ultrasound sensor, according to an exemplary embodiment.

FIG. 1 is a view for explaining a use of an ultrasound sensor 110, according to an exemplary embodiment.

As shown in FIG. 1, an electronic device 120 may be electronic glasses. The electronic glasses may include the ultrasound sensor 110 in order to detect a user's gesture.

Referring to FIG. 1, an area that may be detected by the ultrasound sensor 110 may be an area having an angle marked by an arrow 130. The ultrasound sensor 110 may perform a full scan in a direction of the arrow 130 in order to detect an object 150. Also, the ultrasound sensor 110 may estimate a range in which the object 150 exists and may scan only an area around the object 150. For example, the ultrasound sensor 110 may estimate a range in which the object 150 exists and may scan only an area having an angle marked by an arrow 140.

The object 150 is a solid body to be detected by the ultrasound sensor 110. For example, when the electronic device 120 is to detect the user's hand gesture by using the ultrasound sensor 110, the object 150 may be the user's hand or finger. Also, when the electronic device 120 is to detect an obstacle by using the ultrasound sensor 110, the object 150 may be the obstacle such as a wall, furniture, or a floor.

Figure 2A:
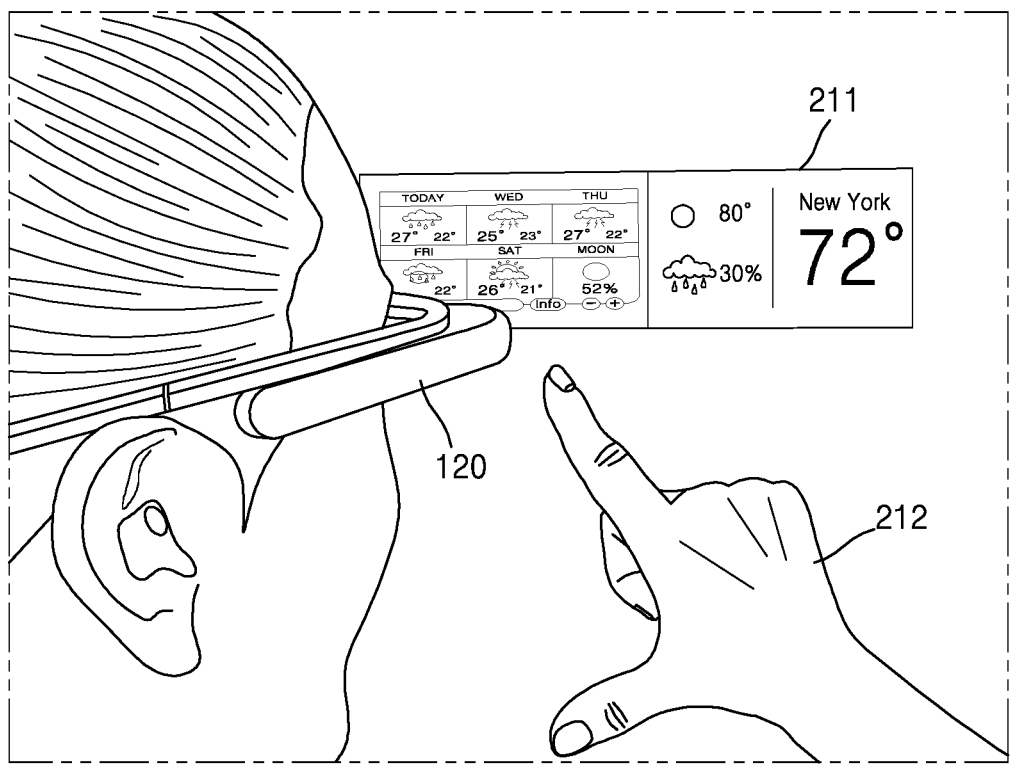
FIGS. 2A through 2C are views illustrating an example where the ultrasound sensor is used in a wearable device in order to detect a hand gesture, according to an exemplary embodiment.
Figure 2B:
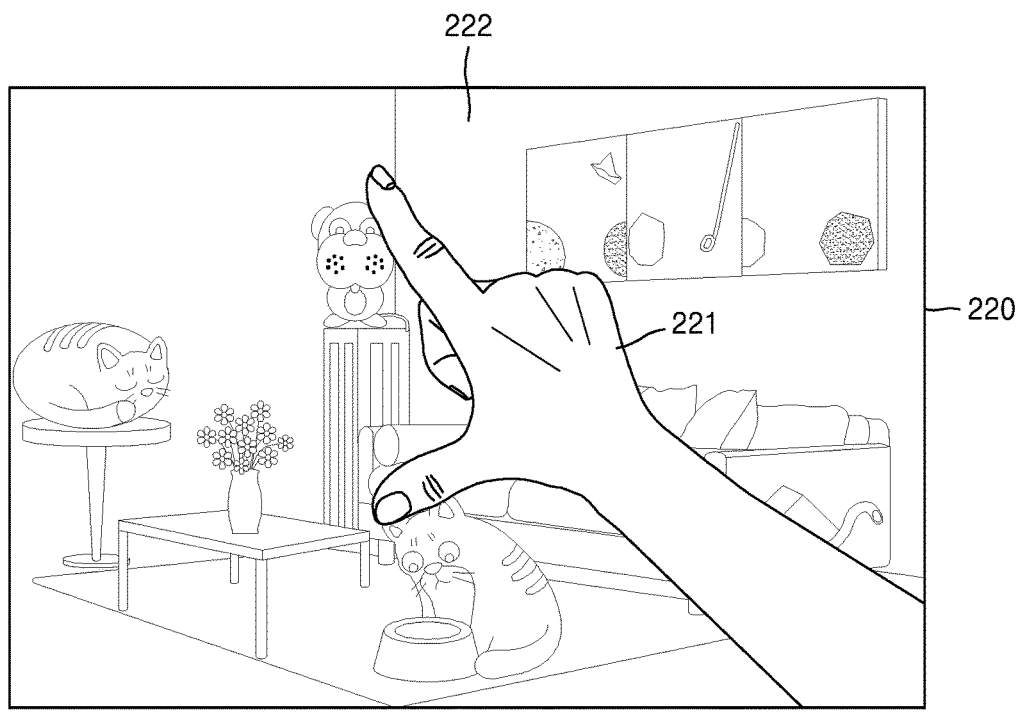
Figure 2C:
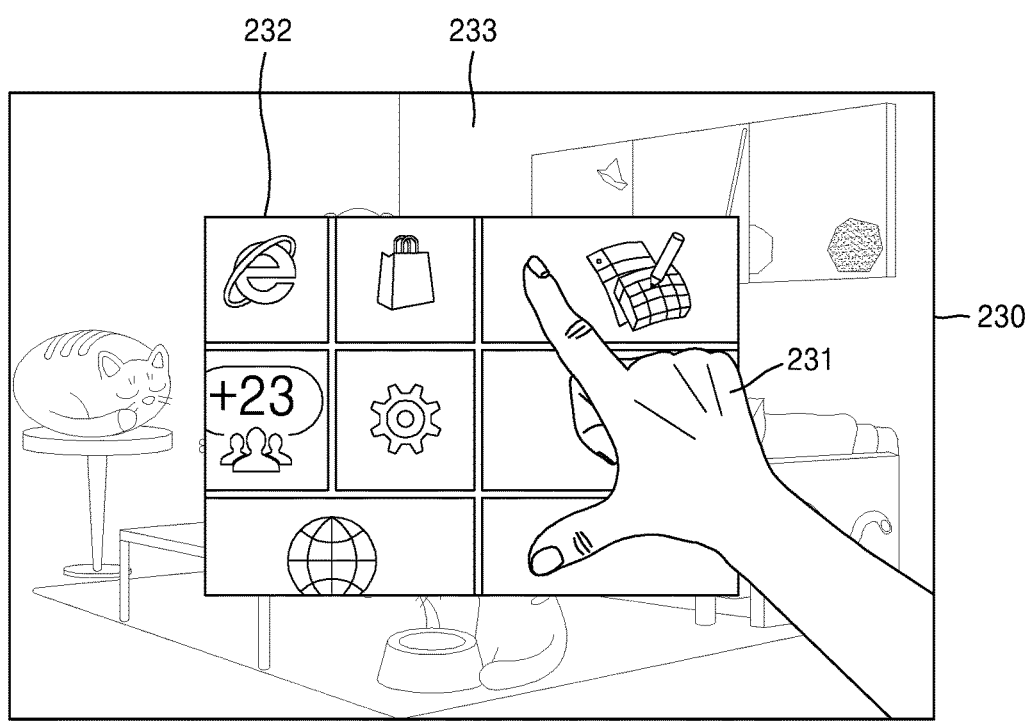
Figure 2D:
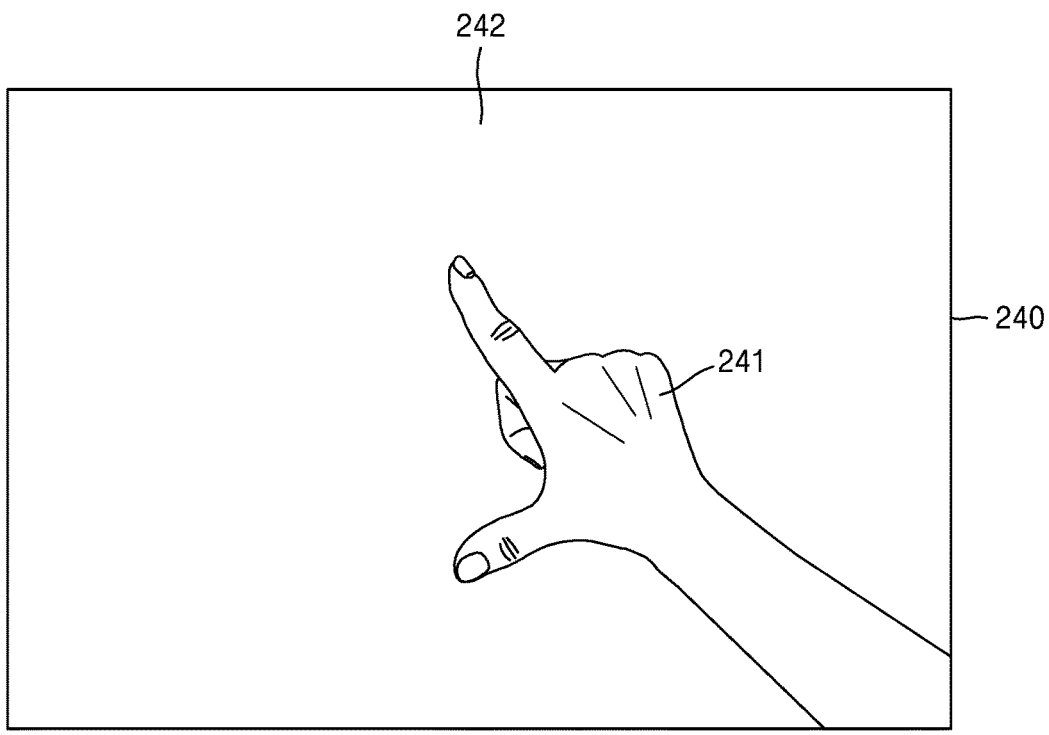

FIGS. 2A through 2C are views illustrating an example where the ultrasound sensor 110 is used in a wearable device in order to detect a hand gesture, according to an exemplary embodiment.

Referring to FIG. 2A, a user may wear the electronic device 120 thereon. The electronic device 120 may cause the user to feel as if a virtual screen 211 exists in a space by near-eye displaying the virtual screen 211 to the user. The virtual screen 211 may be, for example, a user interface (UI). The user may select an icon on the virtual screen 211 by using his/her hand 212. The ultrasound sensor 110 that is included in the electronic device 120 may detect the user's hand 212 as an object. The electronic device 120 may detect the icon that is selected by the user based on the user's hand 212 that is detected by the ultrasound sensor 110.

FIG. 2B is a view illustrating a screen 220 that may be viewed by the user through the electronic device 120. Referring to FIG. 2B, the user's hand and a background 222 may be shown on the screen 220 that is viewed by the user. Unlike in FIG. 2A, the electronic device 120 may not provide a UI. Even when the electronic device 120 does not provide a UI, the electronic device 120 may detect the user's gesture and may receive an input from the user. For example, the electronic device 120 may receive an input based on the user's gesture and may execute an application.

The user's hand may be an object 221 that is to be detected by the ultrasound sensor 110. The background 222 may not need to be detected by the ultrasound sensor 110. When the ultrasound sensor 110 performs a full scan, some of solid bodies in the background 222 as well as the object 221 may be detected. Once the ultrasound sensor 110 detects the solid bodies in the background 222, a speed at which the object 221 is detected is reduced due to unnecessary data processing. Also, the accuracy of detecting the object 221 is also reduced.

Accordingly, a method of rapidly distinguishing the object 221 from the background 222 may be necessary. For example, in order to rapidly distinguish the object 221 from the background 222, the ultrasound sensor 110 may detect a point of a solid body that is the closest to the ultrasound sensor 110 by using a time of flight (TOF). It is highly possible that the object 221 that is to be detected by the ultrasound sensor 110 exists around the point of the solid body that is the closest to the ultrasound sensor 110. Accordingly, the ultrasound sensor 110 may detect the object 221 by scanning a predetermined area from the point of the solid body that is the closest to the ultrasound sensor 110. The TOF will be explained below in detail with reference to FIGS. 4A through 8.

Also, referring to FIG. 2C, the user's hand, a background 233, and a virtual screen 232 may be shown on a screen 230 that is viewed by the user. The user's hand may be an object 231 that is to be detected by the ultrasound sensor 110. The electronic device 120 in which the ultrasound sensor 110 is mounted may provide the virtual screen 232. The virtual screen 232 may be virtually displayed in a space. The background 233 may not need to be detected by the ultrasound sensor 110. Accordingly, the ultrasound sensor 110 may scan only an area where the virtual screen 232 is displayed. The ultrasound sensor 110 that scans only the area where the virtual screen 232 is displayed will be explained below in detail with reference to FIGS. 9A and 9B.

As described above with reference to FIGS. 2B and 2C, the ultrasound sensor 110 according to the present exemplary embodiment may detect an object by scanning only an area where the object is estimated to exist without performing a full scan. In this case, the ultrasound sensor 110 may relatively rapidly and accurately detect the object. An ultrasound sensor according to an exemplary embodiment will be explained in detail with reference to FIGS. 3 through 23.

Figure 3:
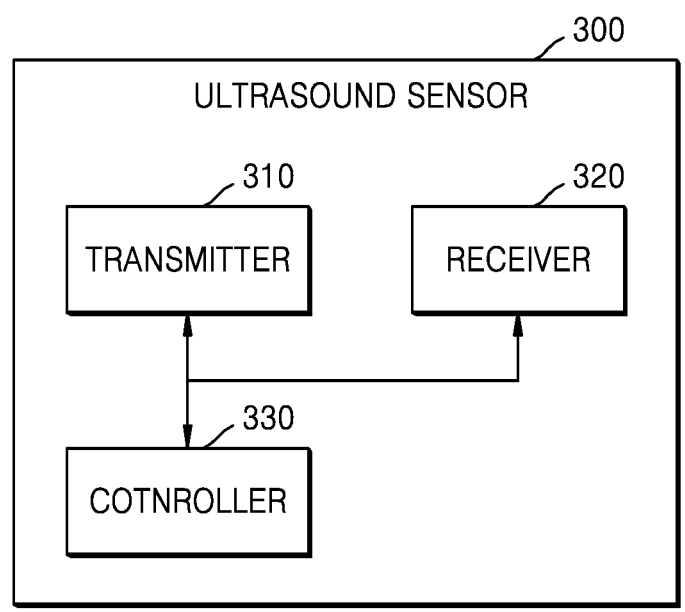
FIG. 3 is a block diagram illustrating an ultrasound sensor according to an exemplary embodiment.

FIG. 3 is a block diagram illustrating an ultrasound sensor 300 according to an exemplary embodiment.

Referring to FIG. 3, the ultrasound sensor 300 includes a transmitter 310, a receiver 320, and a controller 330.

The ultrasound sensor 300 may be organically connected to an electronic device and may perform an operation of detecting an object in the electronic device. Alternatively, the ultrasound sensor 300 may not be connected to an electronic device and may independently perform an operation of detecting an object.

The transmitter 310 outputs a plurality of first ultrasound beams having different frequencies. The transmitter 310 may include a plurality of output elements. The first ultrasound beams may be output by using an arrangement of the plurality of output elements. The controller 330 may output a focused ultrasound beam by switching or steering the first ultrasound beams. The plurality of output elements may include a plurality of piezoelectric elements.

The term 'ultrasound beam' refers to a flow of ultrasound energy that is output from an ultrasound element and whose main part is directly transmitted. The ultrasound beam may be output from an output element and may have a directivity. Examples of the ultrasound beam include an ultrasound signal that is output from one output element. However, when ultrasound that is output from one output element and ultrasound that is output from a plurality of output elements need to be distinguished from each other, the ultrasound that is output from the one output element is referred to as an ultrasound signal and the ultrasound that is output from the plurality of output elements (output array) is referred to as an ultrasound beam.

When an ultrasound beam is switched, it means that the ultrasound beam is turned on or off. Also, when the transmitter 310 changes a phase of an ultrasound signal that is transmitted from each of a plurality of piezoelectric elements or changes a direction in which an ultrasound signal is transmitted by using time delay, it is referred to as steering.

The receiver 320 receives a first reflection signal that is output when the output plurality of first ultrasound beams are reflected from the object. The receiver 320 may include a plurality of input elements. Also, the plurality of input elements may include a plurality of piezoelectric elements.

As described above, the transmitter 310 may include the plurality of output elements. Also, the receiver 320 may include the plurality of input elements. Also, both the plurality of output elements of the transmitter 310 and the plurality of input elements of the receiver 320 may include a plurality of piezoelectric elements. The term 'piezoelectric element' refers to an element that generates a voltage when being pressed and is deformed when a voltage is applied thereto. Also, the plurality of piezoelectric elements that are included in the ultrasound sensor 300 may be used as at least one from among output elements and input elements. Also, piezoelectric elements that are used as output elements may be used as input elements, if necessary.

The controller 330 determines a first area in a space. Also, the controller 330 controls the transmitter 310 to respectively output the plurality of first ultrasound beams to a plurality of first sub-areas that are included in the first area. Also, the controller 330 determines whether the object is included in each of the plurality of first sub-areas based on the first reflection signal. Also, the controller 330 may determine whether to use at least one element from among the plurality of piezoelectric elements as an input element or an output element.

The controller 330 may be embodied as hardware or software, or a combination of hardware and software. The controller 330 may control the transmitter 310 and the receiver 320. For example, the controller 330 may control the transmitter 310 to respectively output the plurality of first ultrasound beams to the plurality of first sub-areas. Also, the controller 330 may determine whether the object is included in each of the plurality of first sub-areas based on the first reflection signal that is received by the receiver 320.

Also, the controller 330 may include a communication interface that communicates with the electronic device in which the ultrasound sensor 300 is mounted. Accordingly, the ultrasound sensor 300 may be organically connected to the electronic device and may perform an operation of detecting the object.

The first area is an area where the object is estimated to exist within an area that may be scanned by the ultrasound sensor 300. Also, the first area may be an area whose dimension varies according to the electronic device in which the ultrasound sensor 300 is mounted. Examples of the first area may include a two-dimensional (2D) area and a three-dimensional (3D) area. The area that may be scanned by the ultrasound sensor 300 may be determined by an area where the transmitter 310 may output an ultrasound beam. The first area may be a part of the area that may be scanned by the ultrasound sensor 300. The first area may be determined based on a virtual screen that is provided by the electronic device. Also, the ultrasound sensor 300 may obtain a point of the object that is the closest to the ultrasound sensor 300 and the controller 330 may determine the first area based on the point.

The first area may include the plurality of first sub-areas. The controller 330 may divide the first area into the plurality of first sub-areas. The controller 330 may enable the plurality of first sub-areas to have overlapping portions. The controller 330 may enable the plurality of first sub-areas to have different sizes. As sizes of the plurality of first sub-areas decrease, a resolution increases. Accordingly, areas having small sizes from among the plurality of first sub-areas may include important information. The plurality of first sub-areas may be further divided into a plurality of smaller sub-areas, which will be explained below in detail with reference to FIGS. 10A through 11D. The ultrasound sensor 300 of FIG. 3 will now be explained in more detail.

Figure 4A:
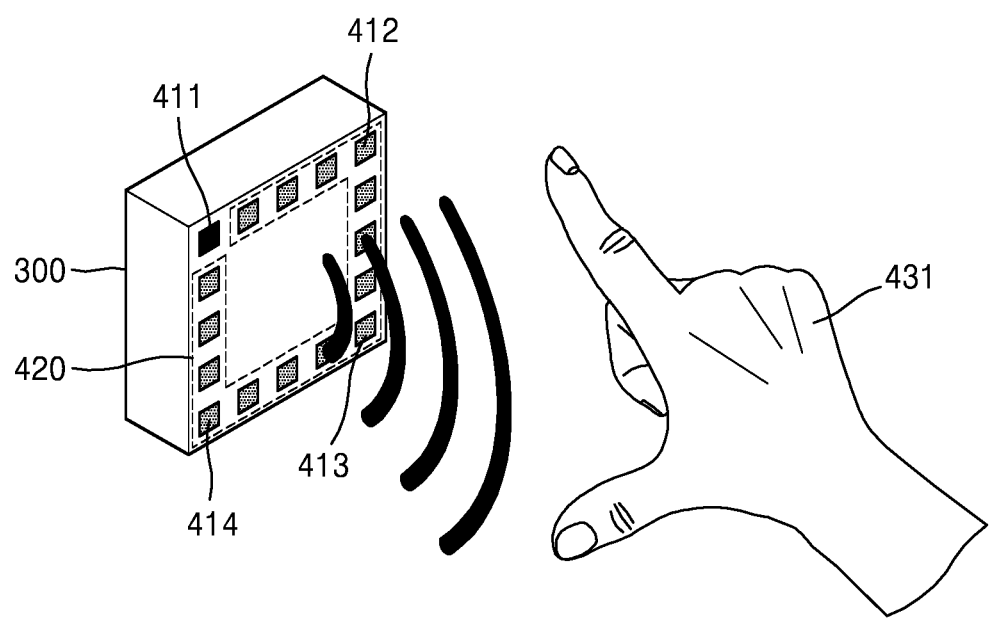
FIGS. 4A through 4C are views for explaining an operation of the ultrasound sensor, according to an exemplary embodiment.
Figure 4B:
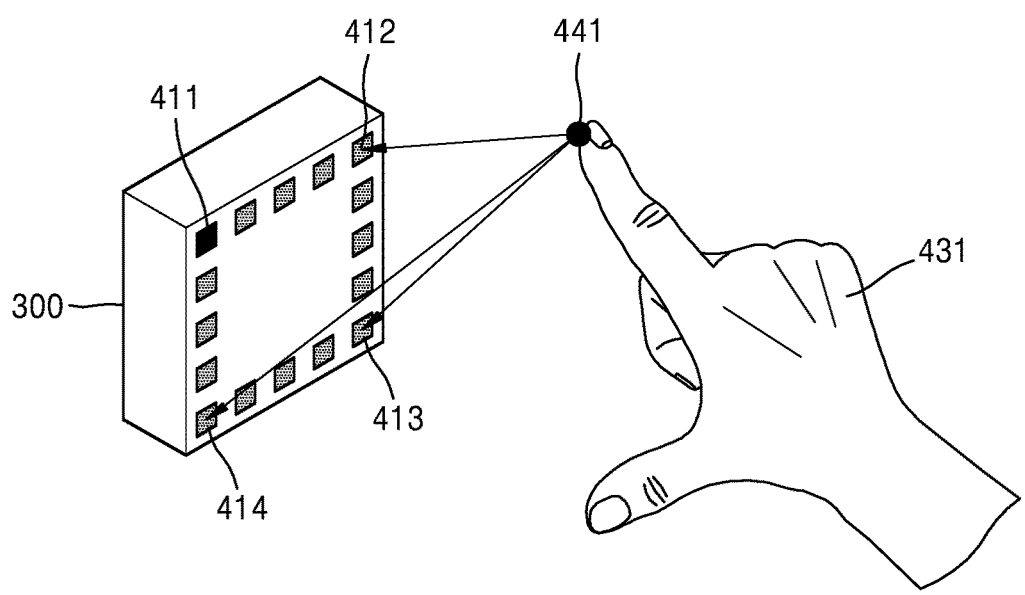
Figure 4C:
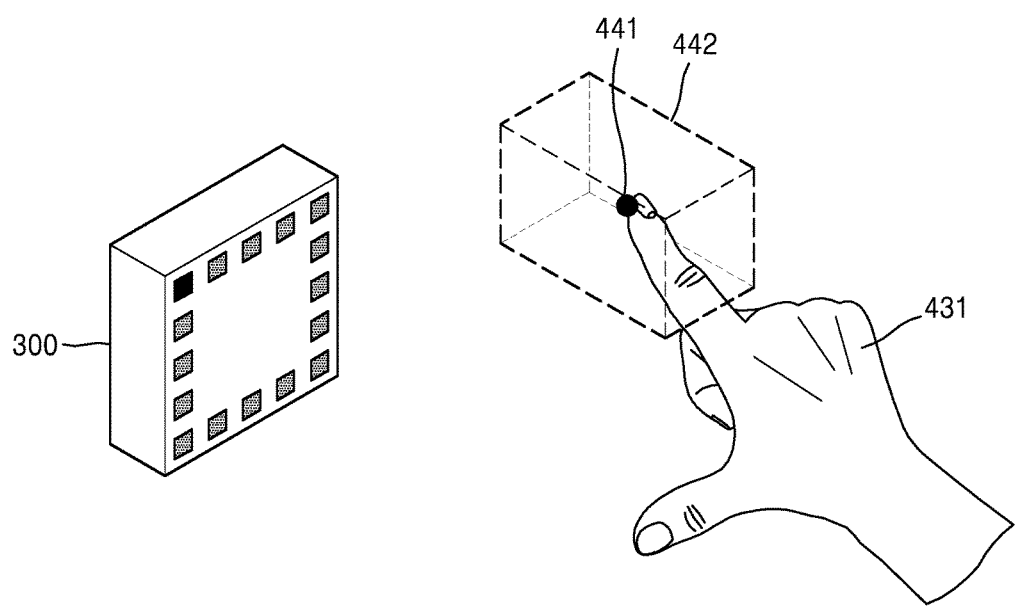

FIGS. 4A through 4C are views for explaining an operation of the ultrasound sensor 300, according to an exemplary embodiment.

The ultrasound sensor 300 may obtain a point of an object that is the closest to an output element of the ultrasound sensor 300. The transmitter 310 may include the plurality of output elements. Also, a first output element from among the plurality of output elements may output an ultrasound beam for determining a first area. Also, the receiver 320 may receive a reflection signal for determining the first area that is output when the ultrasound beam for determining the first area is reflected from the object. The controller 330 may obtain a first point of the object that is the closest to the first output element based on the reflection signal for determining the first area. Also, the controller 330 may determine the first area that includes the first point.

FIGS. 4A through 4C illustrate a case where the ultrasound sensor 300 faces a user's palm. For example, the ultrasound sensor 300 may be mounted on an electronic watch. In order to detect the user's gesture, the ultrasound sensor 300 may face the user's palm. In this case, the ultrasound sensor 300 may detect the user's gesture by detecting the user's finger. In detail, since a point that is the closest to the ultrasound sensor 300 may be estimated to be a fingertip, the ultrasound sensor 300 may detect the finger based on the point. In this case, an object that is to be detected by the ultrasound sensor 300 is the user's finger.

Referring to FIG. 4A, the ultrasound sensor 300 may include a plurality of piezoelectric elements 411 and 420. As described above with reference to FIG. 3, the plurality of piezoelectric elements 411 and 420 may be input elements or output elements.

The piezoelectric elements 411 and 420 may be arranged in a quadrangular shape. However, the present exemplary embodiment is not limited thereto, and the piezoelectric elements 411 and 420 may be arranged in, for example, a ']' shape. Other devices may be disposed in an area other than an area where the piezoelectric elements 411 and 420 are disposed. For example, a display unit or another sensor may be disposed in the area other than the area where the piezoelectric elements 411 and 420 are disposed. An arrangement of the piezoelectric elements 411 and 420 may vary according to a device to which the ultrasound sensor 300 is applied.

The piezoelectric element 411 from among the plurality of piezoelectric elements 411 and 420 may be used as the first output element. The first output element may output forward an ultrasound beam for determining the first area. FIG. 4A illustrates a case where one first output element outputs an ultrasound signal. However, the present exemplary embodiment is not limited thereto, and a plurality of the first output elements that are adjacent to one another may output ultrasound beams.

The ultrasound beam that is output from the piezoelectric element 411 may be reflected from an object 431. The remaining piezoelectric elements 420 may be input elements and may receive a reflection signal. The ultrasound sensor 300 may receive the reflection signal by using at least three from among the piezoelectric elements 420 as input elements. Although piezoelectric elements 412, 413, and 414 from among the piezoelectric elements 420 are used as input elements, the present exemplary embodiment is not limited thereto and other three or more piezoelectric elements from among the piezoelectric elements 420 may be used.

Referring to FIG. 4B, the ultrasound sensor 300 may include the plurality of piezoelectric elements 411, 412, 413, and 414. As described above with reference to FIG. 4A, when the piezoelectric element 411 outputs the ultrasound beam for determining the first area, the remaining piezoelectric elements 412, 413, and 414 may receive the reflection signal for determining the first area that is reflected from the object.

The ultrasound sensor 300 may obtain a first point 441 of the object that is the closest to the piezoelectric element 411 that is the first output element, based on the received reflection signal for determining the first area. In detail, the ultrasound sensor 300 may obtain times T1, T2, and T3 from when the ultrasound beam for determining the first area is output from the piezoelectric element 411 to when the reflection signal for determining the first area is received by the piezoelectric elements 412, 413, and 414. The times T1, T2, and T3 may be propagation times. Since a speed of ultrasound is constant, the ultrasound sensor 300 may calculate distances L1, L2, and L3 from the piezoelectric element 411 through the first point 441 to the piezoelectric elements 412, 413, and 414.

The ultrasound sensor 300 may set up three equations of ellipsoid based on the distances L1, L2, and L3. For example, the ultrasound sensor 300 may set up an ellipsoid equation in which a sum of distances from the piezoelectric element 411 to the piezoelectric element 412 is the distance L1. Accordingly, since there are three ellipsoid equations and three unknown quantities (3D coordinates), the ultrasound sensor 300 may obtain a position of the first point 441 in a 3D space by solving the equations.

FIG. 4C is a view illustrating a first area 442 according to an exemplary embodiment.

Referring to FIG. 4C, the ultrasound sensor 300 may determine the first area 442 that includes the first point 441. Also, the ultrasound sensor 300 may determine a tetrahedron, a hexahedron, or a sphere that includes the first point 441 as the first area 441. For example, the ultrasound sensor 300 may determine an area that is within a predetermined distance from the first point 441 as the first area 442. The predetermined distance for determining the first area may be a preset value or may be a value that is set based on the users input. Also, the ultrasound sensor 300 may receive the predetermined distance from the electronic device in which the ultrasound sensor 300 is mounted. For example, the ultrasound sensor 300 may statistically set the predetermined distance according to a typical size of the object that is to be detected by the electronic device or a distance from the object. Also, the ultrasound sensor 300 may receive the predetermined distance from the user.

In FIGS. 4A through 4C, the ultrasound sensor 300 may try to detect a finger of the user's hand. In this case, the object that is to be detected by the ultrasound sensor 300 may be the user's finger. Also, a point of the object that is the closest to the ultrasound sensor 300 may be the user's fingertip. Accordingly, the predetermined distance may be a length including the finger.

The ultrasound sensor 300 may respectively output a plurality of first ultrasound beams to a plurality of first sub-areas that are included in the first area 442. Also, the ultrasound sensor 300 may determine whether the object is included in each of the plurality of first sub-areas based on a first reflection signal. Since the ultrasound sensor 300 scans only the first area where the object is estimated to exist, the amount of data processing may be reduced and the object may be relatively accurately and rapidly detected.

Figure 5A:
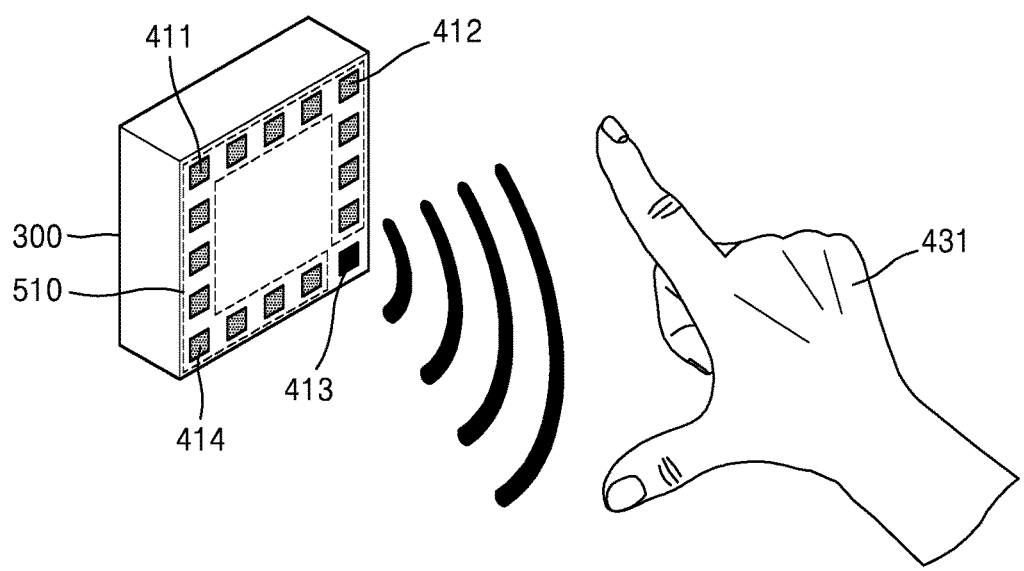
FIGS. 5A through 5C are views for explaining an operation of the ultrasound sensor, according to another exemplary embodiment.
Figure 5B:
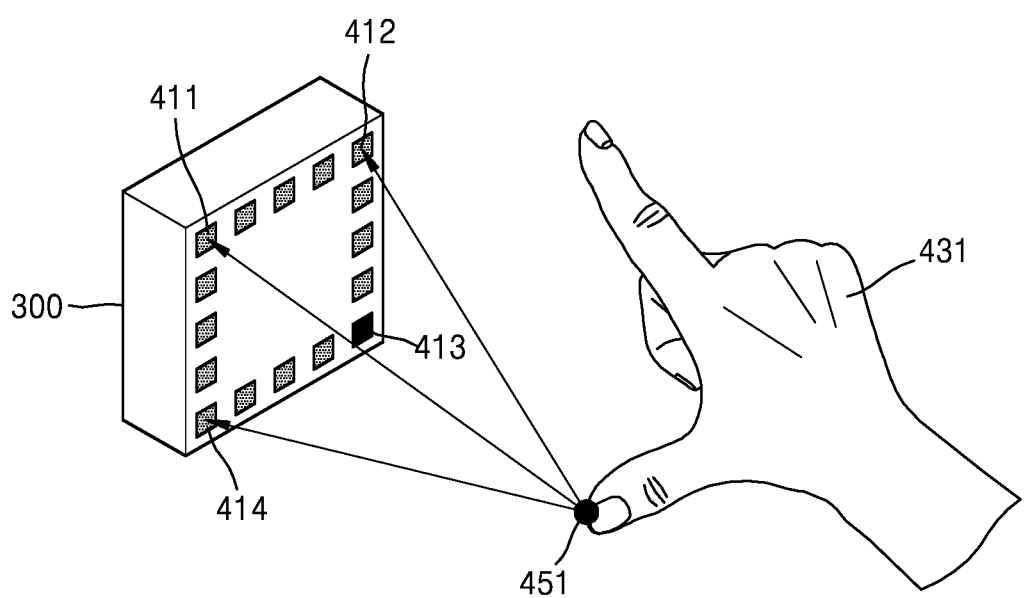
Figure 5C:
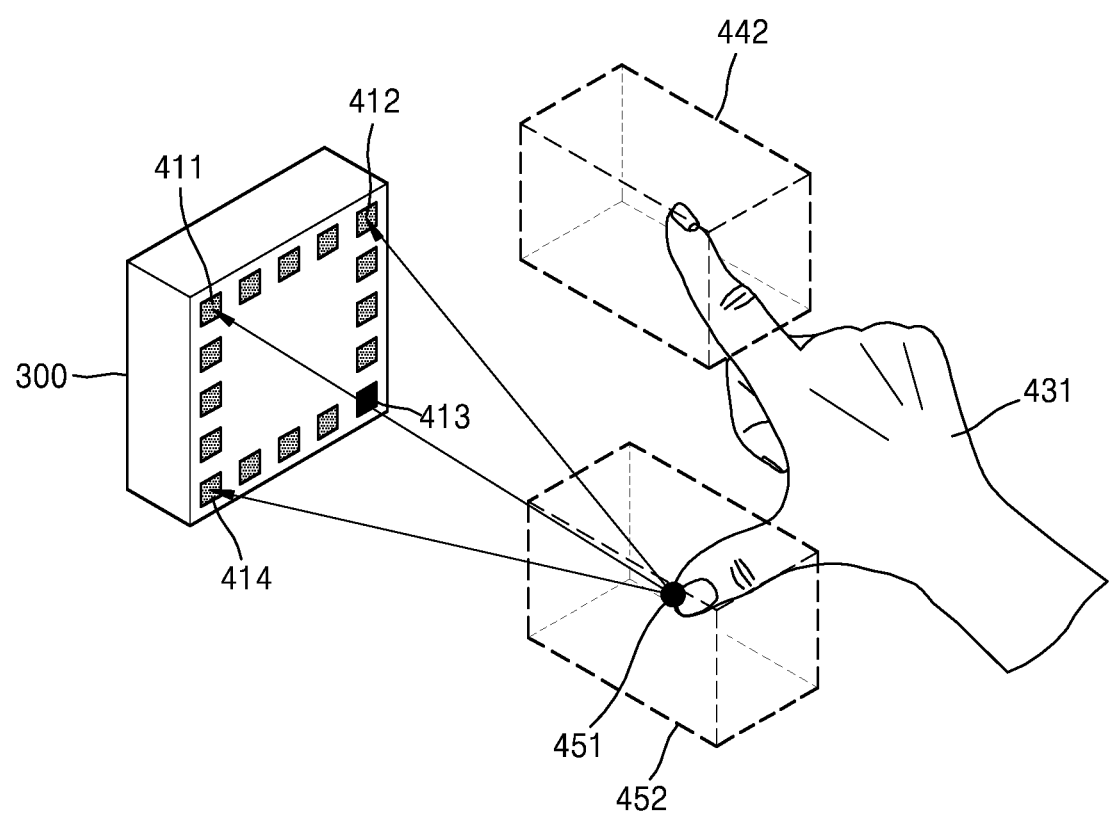

FIGS. 5A through 5C are views for explaining an operation of the ultrasound sensor 300, according to another exemplary embodiment.

The ultrasound sensor 300 may obtain a point of an object that is the closest to an output element of the ultrasound sensor 300 based on a propagation time. Also, when the ultrasound sensor 300 uses a plurality of output elements, the ultrasound sensor 300 may obtain a plurality of points in the object that are respectively the closest to the plurality of output elements.

An electronic device may detect at least one from among positions and movements of a user's fingers. For example, the electronic device may determine whether the user's thumb and forefinger get closer to each other or farther from each other by using the ultrasound sensor 300. In this case, the user's thumb and forefinger may be objects of the ultrasound sensor 300. The electronic device may detect the user's thumb and forefinger by using the ultrasound sensor 300 and may determine whether to enlarge or reduce a screen provided by the electronic device based on at least one from among positions and movements of the thumb and the forefinger.

Also, in order to accurately and rapidly detect an object, the ultrasound sensor 300 may determine a plurality of areas by using a plurality of output elements. For example, an object may be more rapidly detected when the plurality of areas are simultaneously scanned than when the plurality of areas are individually scanned.

FIG. 5A is a view for explaining an operation of the ultrasound sensor 300 that is subsequent to FIG. 4C. A second output element from among the plurality of output elements that are included in the ultrasound sensor 300 may output an ultrasound beam for determining a second area. A plurality of input elements may receive a reflection signal for determining the second area that is output when the ultrasound beam for determining the second area is reflected from the object. Also, the controller 330 may obtain a second point of the object that is the closest to the second output element based on the reflection signal for determining the second area. Also, the controller 330 may determine the second area that includes the second point.

Also, the controller 330 may control the plurality of output elements of the transmitter 310 to respectively output a plurality of first ultrasound beams to a plurality of second sub-areas that are included in the second area. Also, the controller 330 may determine whether the object is included in each of the plurality of second sub-areas based on a first reflection signal.

Referring to FIG. 5A, the ultrasound sensor 300 may include a plurality of piezoelectric elements. The following description will focus on the plurality of piezoelectric elements 411, 412, 413, and 414 from among the plurality of piezoelectric elements 411 and 510. Also, the same description as that already made with reference to FIG. 4A will not be repeated in FIG. 5A.

One piezoelectric element 413 from among the plurality of piezoelectric elements may be used as the second output element. The plurality of piezoelectric elements may be used as output elements or input elements. Accordingly, the ultrasound sensor 300 may use the piezoelectric element 411 as an output element, like in FIG. 4A, and then may use the piezoelectric element 413 as an output element as shown in FIG. 5A. Also, the remaining piezoelectric elements 510 may be used as input elements. The second output element may output forward an ultrasound beam for determining the second area.

FIG. 5A illustrates a case where one second output element outputs an ultrasound signal. However, the present exemplary embodiment is not limited thereto, and a plurality of the second output elements that are adjacent to one another may output ultrasound beams.

An ultrasound beam that is output from the piezoelectric element 413 may be reflected from the object 431. The remaining piezoelectric elements 411, 412, and 414 may be input elements. The ultrasound sensor 300 may use the piezoelectric element 411 as an output element, like in FIG. 4A and then may use the piezoelectric element 413 as an output element as shown in FIG. 5A. Also, the remaining piezoelectric elements 411, 412, and 414 may be used as input elements.

The ultrasound beam that is output from the piezoelectric element 413 may be reflected from the object 431. The remaining piezoelectric elements 510 may be input elements and the input elements may receive reflection signals. The ultrasound sensor 300 may receive the reflection signals by using three or more from among the piezoelectric elements 510.

Referring to FIG. 5B, the ultrasound sensor 300 may include the plurality of piezoelectric elements 411, 412, 413, and 414. When the piezoelectric element 413 outputs the ultrasound beam for determining the second area as described above with reference to FIG. 5A, the remaining piezoelectric elements 411, 412, and 414 may receive reflection signals for determining the second area that is reflected from the object 431.

The ultrasound sensor 300 may obtain a second point 451 that is the closest to the piezoelectric element 413 that is the second output element, based on the reflection signals for determining the second area. How the ultrasound sensor 300 obtains the second point 451 based on the reflection signals that are received by three or more input elements have already been described in detail with reference to FIG. 4B, and thus a detailed explanation thereof will not be given.

FIG. 5C is a view illustrating the first area 442 and a second area 452 according to an exemplary embodiment.

Referring to FIG. 5C, the ultrasound sensor 300 may determine the first area 442 that includes the first point 441 as described above with reference to FIG. 4C. Also, the ultrasound sensor 300 may determine the second area 452 that includes the second point 451. For example, the ultrasound sensor 300 may determine an area that is within a predetermined distance from the second point 451 as the second area 452.

Like in FIGS. 4A through 4C, the ultrasound sensor 300 may try to detect a finger of the user's hand in FIGS. 5A through 5C. Also, a point of the object that is the closest to the ultrasound sensor 300 may be the user's fingertip. Accordingly, the ultrasound sensor 300 may respectively determine areas that are within predetermined distances from the first point 441 and the second point 451 as the first area 442 and the second area 452. Also, the predetermined distances may be lengths that include the finger.

The ultrasound sensor 300 may control the transmitter 310 to respectively output the plurality of first ultrasound beams to the plurality of second sub-areas that are included in the second area 452. Also, the ultrasound sensor 300 may determine whether the object is included in each of the plurality of second sub-areas based on the first reflection signal. Since the ultrasound sensor 300 does not perform a full scan, the amount of data processing may be reduced and the object may be relatively accurately and rapidly detected.

Referring to FIGS. 4A through 5C, the ultrasound sensor 300 may use two piezoelectric elements as output elements. Also, the ultrasound sensor 300 may determine the first area 442 and the second area 452 based on the two output elements. In FIGS. 5A through 5C, the ultrasound sensor 300 determines the first area 442 and then scans the first area 442, and determines the second area 452 and then scans the second area 452. However, the present exemplary embodiment is not limited thereto, and the ultrasound sensor 300 may determine the first area 442 and the second area 452, and then may scan the first area 442 and the second area 452.

Also, although the piezoelectric element 411 and the piezoelectric element 413 are respectively output elements in FIGS. 4A through 5C, the present exemplary embodiment is not limited thereto and each of a plurality of piezoelectric elements may be an output element. As the number of piezoelectric elements that are used as output elements increases, the number of scan areas may increase. For example, two scan areas, that is, the first and second areas 442 and 452, are determined by using the piezoelectric element 411 and the piezoelectric element 413 in FIGS. 4A through 5C. However, when five piezoelectric elements are used, up to five scan areas may be determined.

Figure 6:
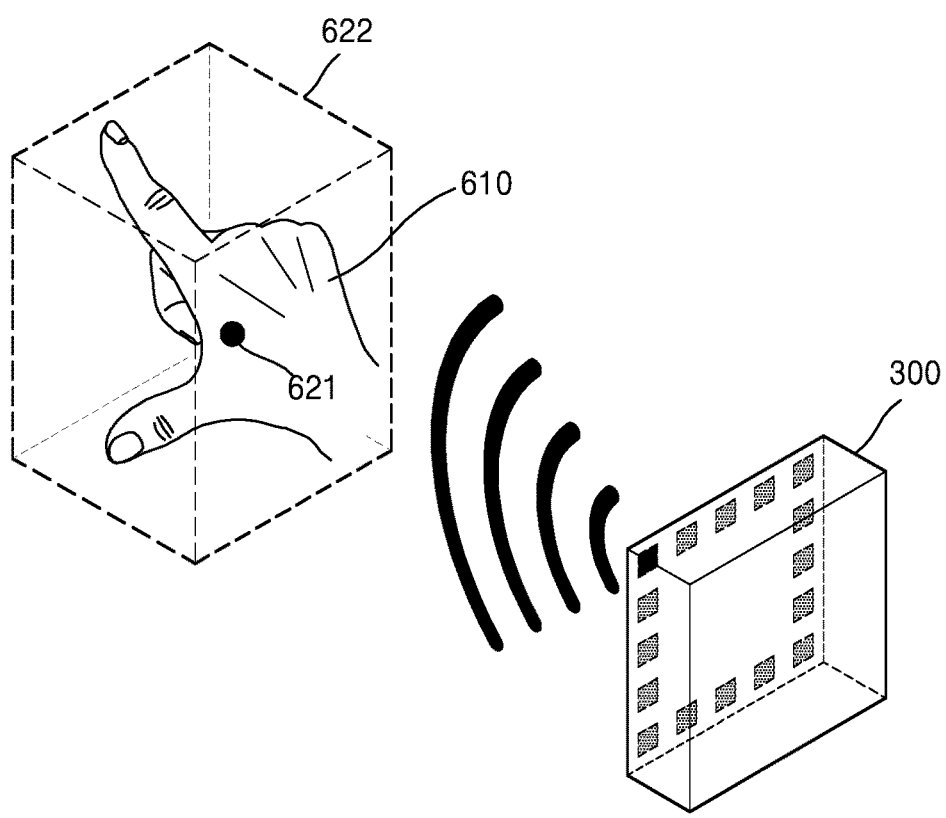
FIG. 6 is a view for explaining an operation of the ultrasound sensor, according to another exemplary embodiment.

FIG. 6 is a view for explaining an operation of the ultrasound sensor 300, according to another exemplary embodiment.

FIG. 6 illustrates a case where the ultrasound sensor 300 faces the back of a user's hand. For example, the ultrasound sensor 300 may be mounted in electronic glasses. The electronic glasses may detect movements of the user's fingers by using the ultrasound sensor 300. In this case, the user's fingers may be objects of the ultrasound sensor 300. The electronic glasses may perform various operations based on the movements of the user's fingers. For example, the electronic glasses may determine whether a menu is selected, whether a screen that is provided by the electronic glasses is to be enlarged, etc. based on the movements of the user's fingers.

Referring to FIG. 6, the ultrasound sensor 300 may obtain a first point 621 of an object 610 that is the closest to a predetermined output element by using a process of FIGS. 4A through 4C. Also, the ultrasound sensor 300 may determine a first area 622 based on the first point 621.

In FIG. 6, the ultrasound sensor 300 may detect the user's finger in order to determine the user's hand gesture. Also, a point of the object 610 that is the closest to the ultrasound sensor 300 may be the back of the user's hand. That is, the point of the object that is the closest to the ultrasound sensor 300 and an object that is to be detected by the ultrasound sensor 300 are different from each other. Accordingly, when the ultrasound sensor 300 determines an area that is within a predetermined distance from the first point 621 as the first area 622, the predetermined distance may be generally a length that includes the hand.

Figure 7:
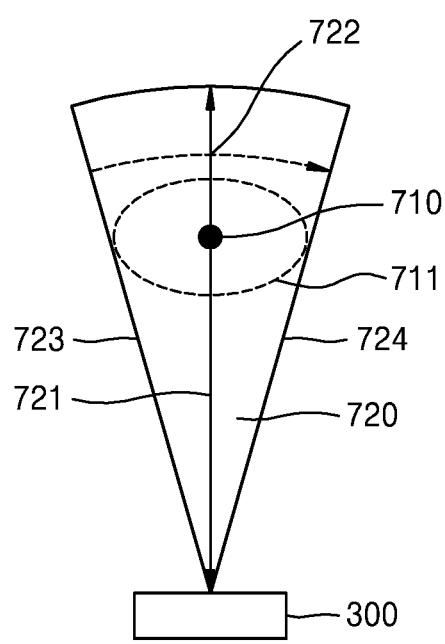
FIG. 7 is a view illustrating a two-dimensional (2D) detection area of the ultrasound sensor, according to an exemplary embodiment.

FIG. 7 is a view illustrating a 2D detection area of the ultrasound sensor 300, according to an exemplary embodiment.

Referring to FIG. 7, the ultrasound sensor 300 may detect an object in a 2D area 720. The 2D area 720 may include a distance axis and an angle axis from the ultrasound sensor 300. It is assumed that the controller 330 obtains a first point 710, like in FIGS. 4A through 4C. Also, the controller 330 may determine a first area 711 based on the first point 710. The ultrasound sensor 300 may steer an ultrasound beam in order to scan an area including the first area 711. For example, the ultrasound sensor 300 may scan the 2D area 720.

A maximum distance 721 that may be detected by the ultrasound sensor 300 may be determined by using at least one from among an intensity of an output of the transmitter 310 and properties of an ultrasound beam. For example, a detection range increases as the ultrasound beam has a lower frequency. That is, as the ultrasound sensor 300 uses an ultrasound beam having a lower frequency, the maximum distance 721 may increase. Accordingly, the ultrasound sensor 300 may control at least one from among the intensity of the output of the transmitter 310 and a frequency of the ultrasound beam in order to scan an area including the first area 711.

Also, the ultrasound sensor 300 may control an angle 722 to include the first area 711. For example, the ultrasound sensor 300 may steer an ultrasound beam by using the transmitter 310 having an arrangement of a plurality of output elements. For example, the ultrasound sensor 300 may control the transmitter 310 to output an ultrasound beam at a predetermined angle from a line 723 to a line 724. Accordingly, the ultrasound sensor 300 may detect the object in the 2D area 720.

Figure 8:
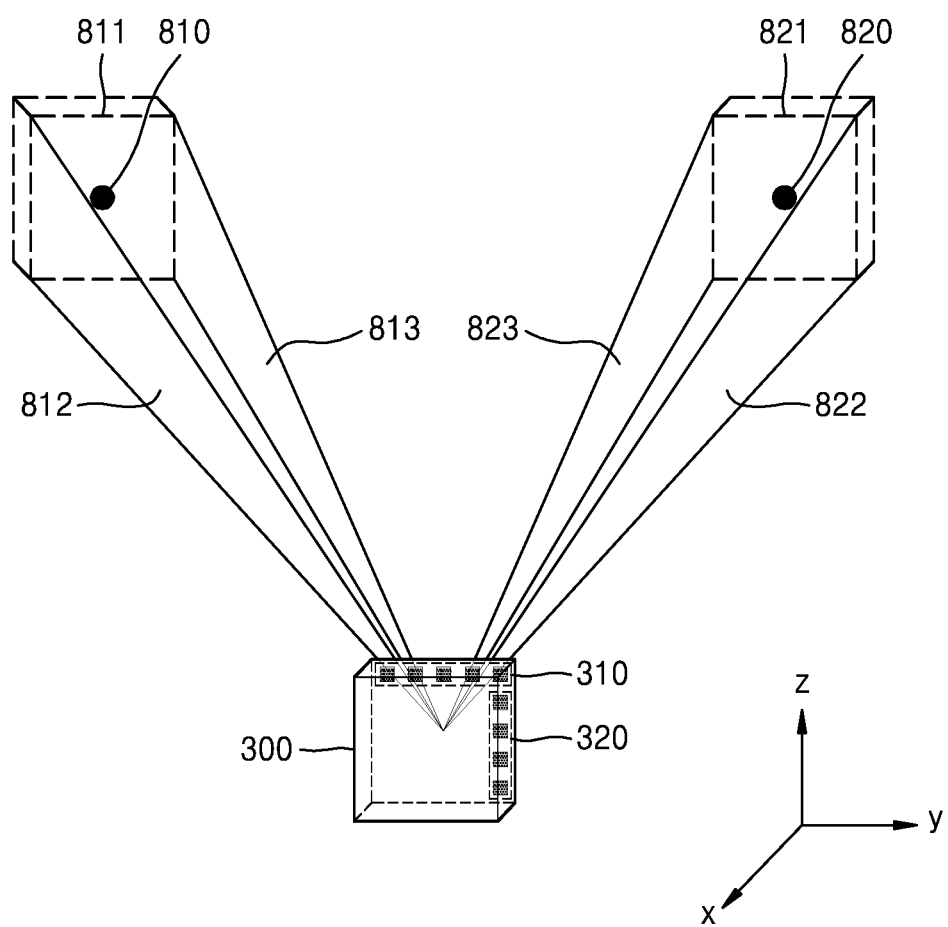
FIG. 8 is a view illustrating a three-dimensional (3D) detection area of the ultrasound sensor, according to an exemplary embodiment.

FIG. 8 is a view illustrating a 3D detection area of the ultrasound sensor 300, according to an exemplary embodiment.

Referring to FIG. 8, the ultrasound sensor 300 may detect objects in a plurality of 3D areas 812 and 822. As described above with reference to FIGS. 4A through 4C, the controller 330 may obtain a first point 810 and a second point 820. Also, the controller 330 may obtain a first area 811 and a second area 821 respectively based on the first point 810 and the second point 820.

As described above with reference to FIG. 7, the ultrasound sensor 300 may control a maximum detection distance to include the first area 811 and the second area 821. Also, in order to control the maximum detection distance of the ultrasound sensor 300, the ultrasound sensor 300 may control at least one from among an intensity of an output of the transmitter 310 and properties of an ultrasound beam.

Also, as described above with reference to FIG. 7, the ultrasound sensor 300 may control the transmitter 310 to output an ultrasound beam at a predetermined angle from a surface 812 to a surface 813. Likewise, the ultrasound sensor 300 may control the transmitter 310 to output an ultrasound beam at a predetermined angle from a surface 823 to a surface 822. For example, the transmitter 310 may include a plurality of output elements that are arranged along a y-axis. Since the plurality of output elements are arranged along the y-axis, the ultrasound sensor 300 may steer the ultrasound beams along the y-axis.

Also, the ultrasound sensor 300 may include the receiver 320. The receiver 320 may include a plurality of input elements that are arranged along a z-axis. Since the plurality of input elements are arranged along the z-axis, the ultrasound sensor 300 may detect a position of an object along the z-axis. Also, a speed of ultrasound is constant, the ultrasound sensor 300 may obtain a distance between the ultrasound sensor 300 and the object by obtaining a time taken for the ultrasound that is output from the transmitter 310 to reach the receiver 320. Accordingly, the ultrasound sensor 300 may detect the object in a 3D space.

In FIG. 8, the plurality of output elements are arranged along the y-axis and the plurality of input elements are arranged along the z-axis. However, the present exemplary embodiment is not limited thereto, and the plurality of output elements may be arranged along the z-axis and the plurality of input elements may be arranged along the y-axis. Since the plurality of output elements are arranged along the z-axis, the ultrasound sensor 300 may steer ultrasound beams along the z-axis. Also, the ultrasound sensor 300 may detect a position of the object along the y-axis based on reflection signals that are received by the input elements. Also, although an output element array and an input element array are perpendicular to each other, the present exemplary embodiment is not limited thereto. The object in the 3D space may be detected unless the output element array and the input element array are parallel to each other.

Figure 9A:
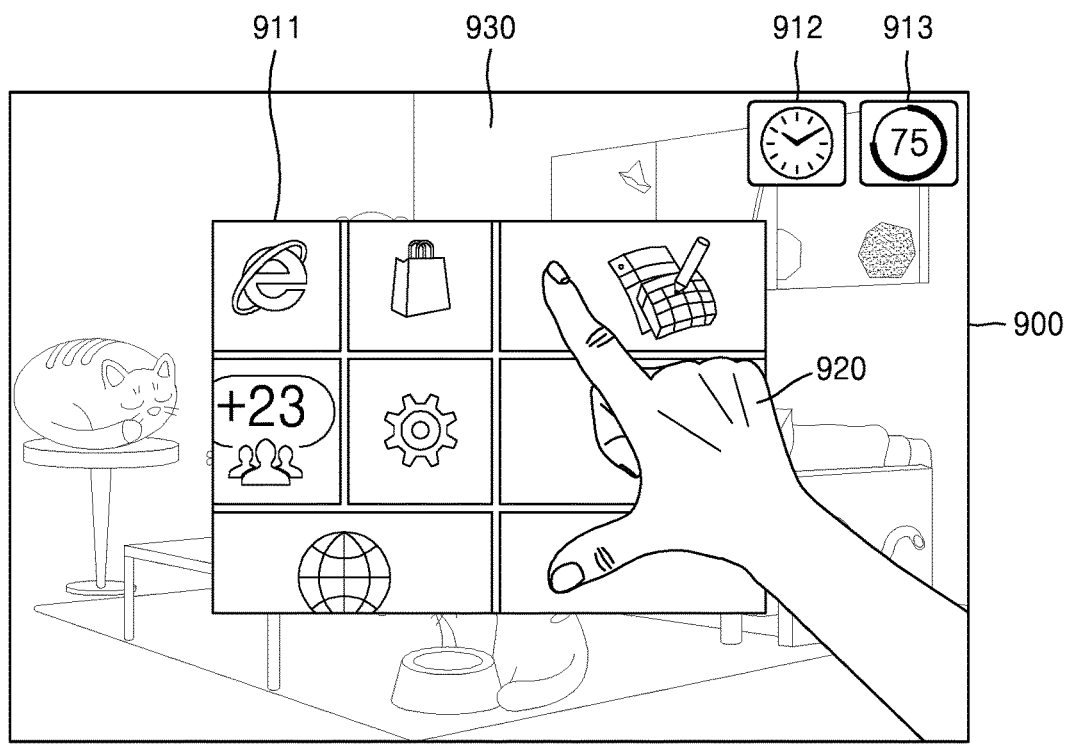
FIGS. 9A and 9B are views illustrating screens that may be viewed by a user through an electronic device, according to an exemplary embodiment.
Figure 9B:
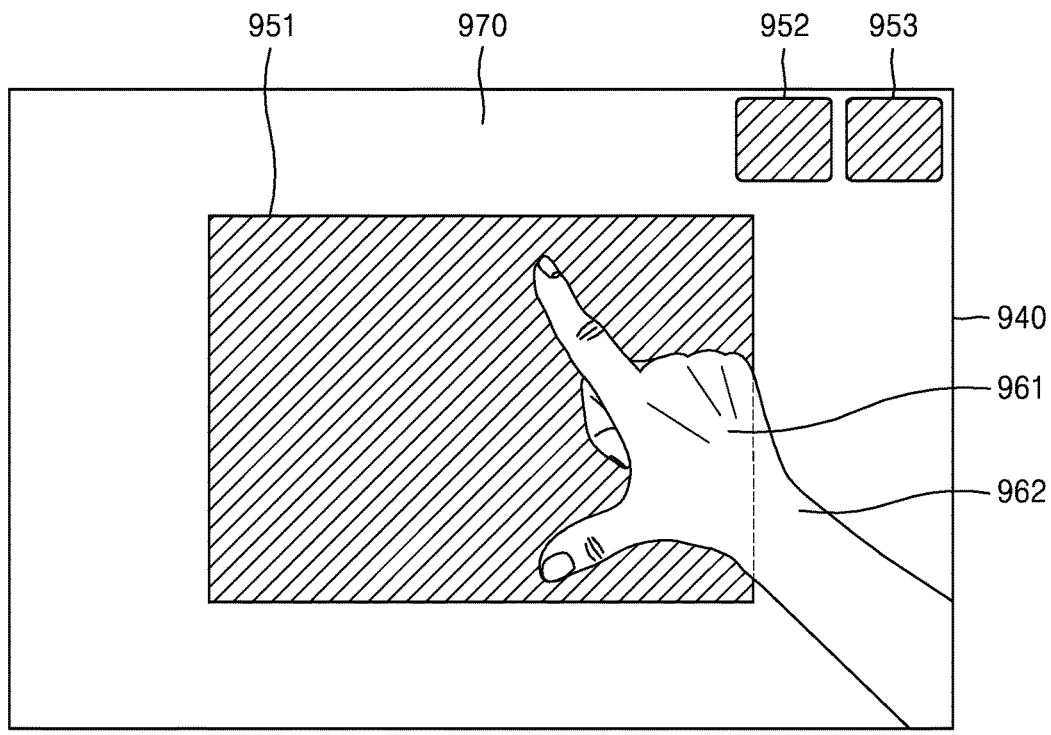

FIGS. 9A and 9B are views illustrating screens that may be viewed by a user through an electronic device, according to an exemplary embodiment. The ultrasound sensor 300 may be used in the electronic device. The controller 330 may determine a first area based on a UI that is provided by the electronic device in a space. Also, the controller 330 may determine at least one from among sizes, positions, and shapes of a plurality of first sub-areas based on the UI. The ultrasound sensor 300 that determines at least one from among sizes, positions, and shapes of the plurality of first sub-areas will be explained below in more detail.

The ultrasound sensor 300 may perform a scan based on an area where a virtual screen (or the UI) is displayed. For example, the user may wear the electronic device thereon as described above with reference to FIG. 2A. The electronic device may be, for example, electronic glasses. The electronic device may include the ultrasound sensor 300.

As shown in FIGS. 9A and 9B, a user may select, with his/her hand 920, a specific icon on the UI that is provided by the electronic device. For example, the electronic device may detect that the user has selected the specific icon when the user's hand 920 stays on the specific icon for a predetermined period of time or more or when a distance between the user's hand 920 and the electronic device is changed.

Referring to FIG. 9A, the user may view a screen 900 through the electronic device. The user may view his/her hand 920 in the screen 900 through the electronic device. Also, the user may view a background 930 through the electronic device. The electronic device may display the virtual screen in the space. The virtual screen may be the UI that is provided by the electronic device. For example, at least one from among an icon of an application, a widget, and text that contains a wide range of information may be included in the virtual screen.

The icon and the widget are included in the UI that is provided by the electronic device. The icon for executing an application that is provided by the electronic device may have at least one from among a geometric figure, a symbol, an image, and text. Also, the widget for displaying information that is provided by the electronic device may have at least one from among a geometric figure, a symbol, an image, and text. The widget may also be used to execute an application.

In more detail, the virtual screen that is provided by the electronic device may include icons 911 for executing an application. The widget that is provided by the electronic device may include a clock widget 912. Also, the widget that is provided by the electronic device may include a battery widget 913 that includes text indicating a battery residual quantity. The electronic device may provide a spatial position of the virtual screen to the ultrasound sensor 300.

Referring to FIG. 9B, the virtual screen that is provided by the electronic device in the space may include the UI. The ultrasound sensor 300 may obtain the first area based on the spatial position of the virtual screen that is provided from the electronic device. For example, an area 940 that may be detected by the ultrasound sensor 300 may be divided into an area 970 of a background and areas 951, 952, and 953 of the virtual screen, based on the spatial position of the virtual screen that is provided by the electronic device. Also, the ultrasound sensor 300 may determine each of the areas 951, 952, and 953 of the virtual screen as the first area.

Also, the ultrasound sensor 300 may determine whether an object exists by scanning the first screen. Accordingly, the ultrasound sensor 300 determines whether a portion 961 of the users hand that is the object exists in the first area. Also, the ultrasound sensor 300 may not determine whether a portion 962 of the user's hand exist out of the first area. That is, since the ultrasound sensor 300 scans only the first area without performing a full scan, the amount of data processing may be reduced. Also, the ultrasound sensor 300 may relatively rapidly and accurately determine whether the object exists. The controller 330 may determine at least one from among sizes, positions, and shapes of the first sub-areas based on the virtual screen that is provided by the electronic device.

The controller 330 may determine shapes of the first sub-areas that are included in the first area according to a shape of the UI that is provided by the electronic device. For example, icons may be included in the UI that is provided by the electronic device. When the icons have quadrangular shapes, the controller 330 may set the first sub-areas that are included in the first area to quadrangular shapes. Also, boundaries of the first sub-areas may be set to boundaries of the icons 911.

Also, the controller 330 may determine sizes of the first sub-areas according to a size of the UI that is provided by the electronic device. For example, icons may be included in the UI that is provided by the electronic device. When the icons that are provided by the electronic device are small, in order to determine whether the user's hand stays on the small icons, the controller 330 may reduce sizes of the first sub-areas.

Also, the ultrasound sensor 300 may detect the user's hand at a higher resolution in an area where the ultrasound sensor 300 needs to more sensitively react to a movement of the user's hand from among the first area. Accordingly, the controller 330 may set a first sub-area having a smaller size to the area where the ultrasound sensor 300 has to more sensitively react to the movement of the user's hand from among the first area. For example, since areas where the clock widget 912 and the battery widget 913 exist are areas that simply provide information to the user, the ultrasound sensor 300 may be less sensitive to the movement of the user's hand in the areas where the clock widget 912 and the battery widget 913 exist. However, an area where the icons 911 are displayed is an area where the user's selection is often made. Also, since it has to be detected that one icon from among the various icons 911 is selected, the ultrasound sensor 300 has to sensitively react to the movement of the user's hand. Accordingly, the controller 330 may set a first sub-area having a small size to the area of the icons 911.

Figure 10A:
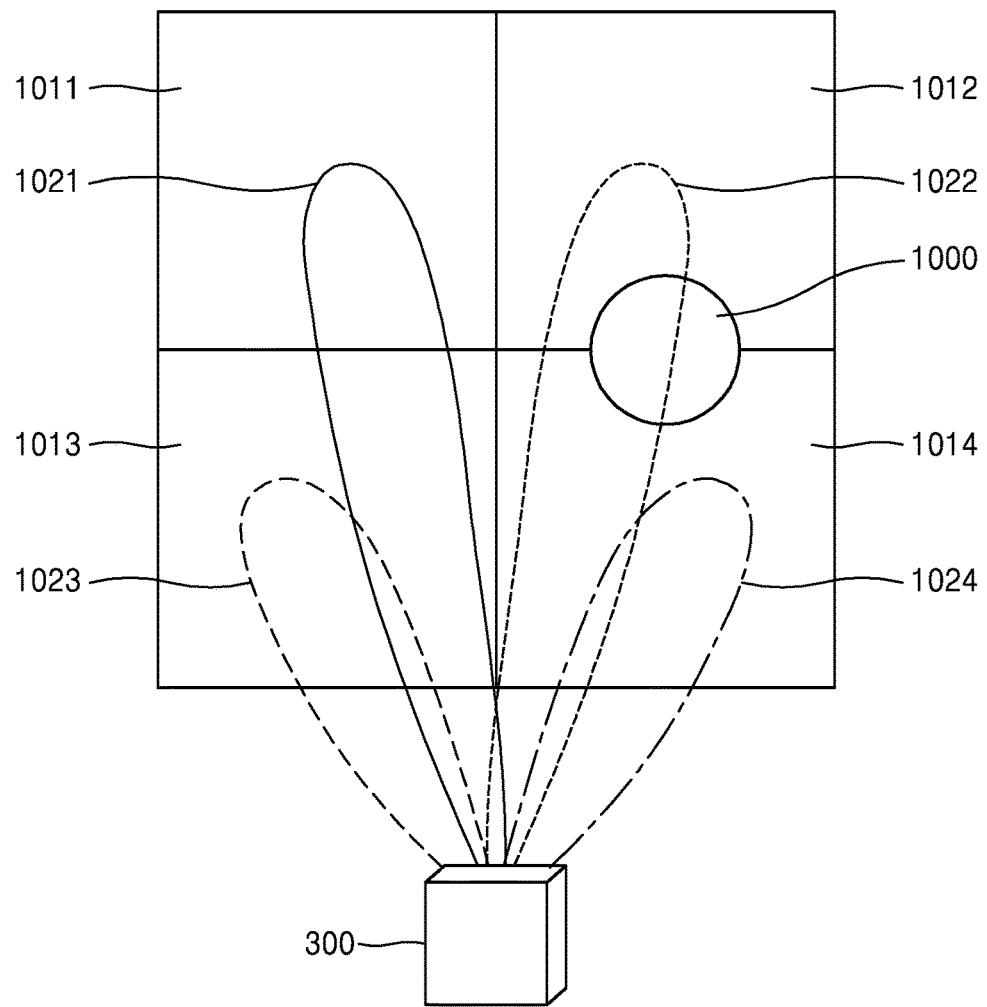
FIGS. 10A through 10C are views illustrating a plurality of sub-areas according to an exemplary embodiment.

FIGS. 10A through 10O are views illustrating a plurality of sub-areas according to an exemplary embodiment, according to an exemplary embodiment.

Referring to FIG. 10A, a first area may be divided into first sub-areas 1011, 1012, 1013, and 1014. The ultrasound sensor 300 may control the transmitter 310 to respectively output a plurality of ultrasound beams 1021, 1022, 1023, and 1024 to the plurality of first sub-areas 1011, 1012, 1013, and 1014 that are included in the first area. Also, although the first area and the first sub-areas 1011, 1012, 1013, and 1014 have been explained above, the same goes to a second area and second sub-areas. Although the first area and the first sub-areas 1011, 1012, 1013, and 1014 are explained, the same goes to the second area and the second sub-areas, and thus a detailed explanation of the second area and the second sub-areas will not be given.

Figure 10B:
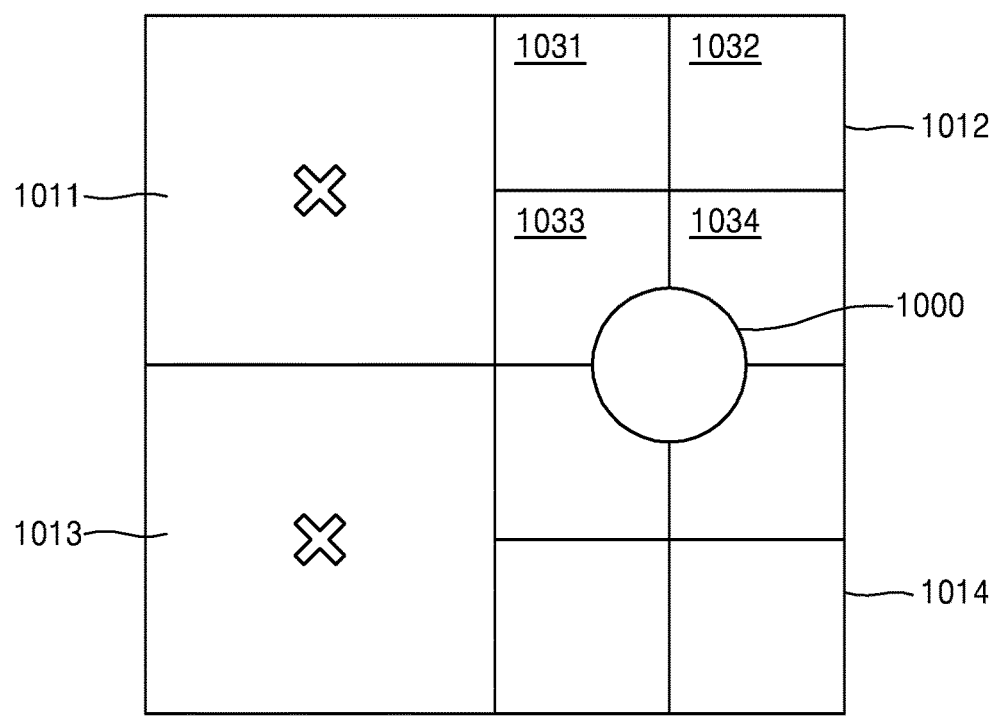

Referring to FIG. 10B, the ultrasound sensor 300 may determine whether an object 1000 is included in each of the plurality of first sub-areas 1011, 1012, 1013, and 1014 based on a first reflection signal that is received by the receiver 320. For example, the ultrasound sensor 300 may determine that the object 1000 does not exist in the first sub-area 1011 and the first sub-area 1013. Also, the ultrasound sensor 300 may determine that the object 1000 exists in the first sub-area 1012 and the first sub-area 1014.

The controller 330 may control the transmitter 310 to respectively output a plurality of ultrasound beams to a plurality of third sub-areas that are included in the plurality of first sub-areas 1011, 1012, 1013, and 1014. Also, the controller 330 may determine whether the object 1000 is included in each of the plurality of third sub-areas based on a plurality of second reflection signals that are received by the receiver 320. As such, since sub-areas in which the object 1000 exists are divided into smaller sub-areas and it is further determined whether the object 1000 exists in each of the smaller sub-areas, the amount of data processing may be reduced.

In more detail, the controller 330 may determine that the object 1000 is included in the first sub-areas 1012 and 1014 from among the first sub-areas 1011, 1012, 1013, and 1014. The controller 330 may divide the first sub-areas 1012 and 1014 into third sub-areas. For example, the controller 330 may divide the first sub-area 1012 into third sub-areas 1031, 1032, 1033, and 1034. The ultrasound sensor 300 may control the transmitter 310 to respectively output the second ultrasound beams to the third sub-areas 1031, 1032, 1033, and 1034.

Figure 10C:
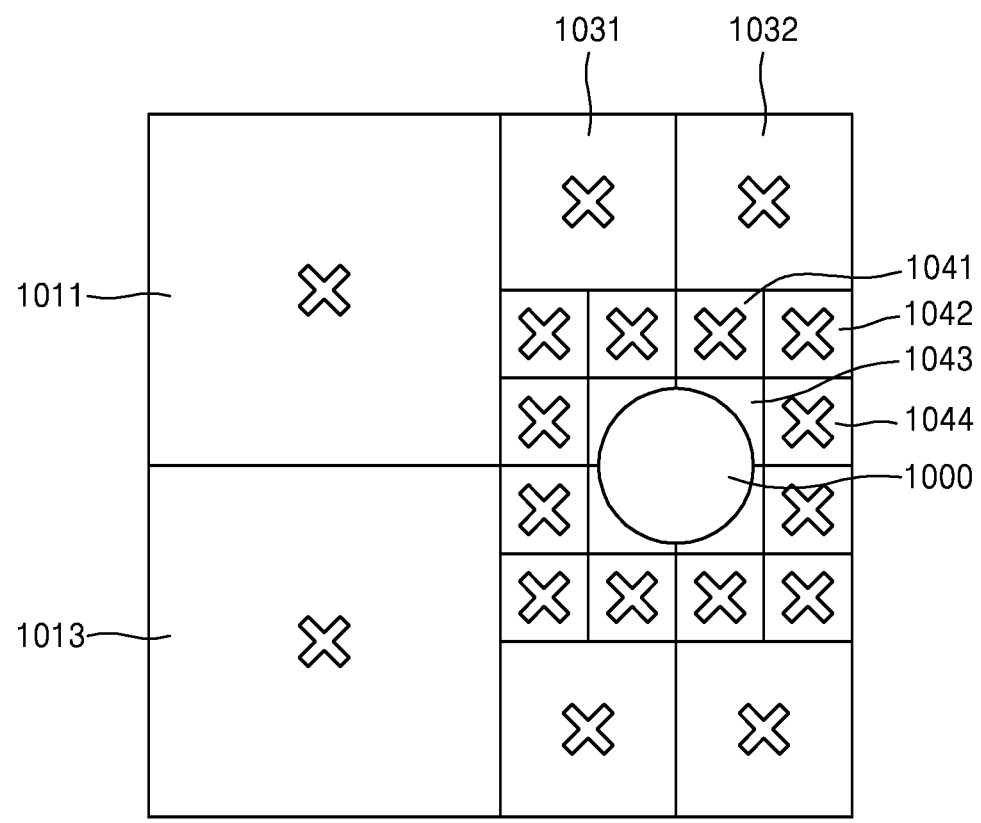

Referring to FIG. 10C, the ultrasound sensor 300 may determine whether the object 1000 is included in each of the plurality of third sub-areas 1031, 1032, 1033, and 1034 based on the second reflection signal that is received by the receiver 320. For example, the ultrasound sensor 300 may determine that the object 1000 does not exist in the third sub-area 1031 and the third sub-area 1032.

Like in FIG. 10B, the controller 330 may divide the third sub-areas where the object 1000 is determined to exist into smaller sub-areas. For example, the controller 330 may divide the third sub-area 1034 from among the third sub-areas 1033 and 1034 into sub-areas 1041, 1042, 1043, and 1044. The ultrasound sensor 300 may control the transmitter 310 to respectively output ultrasound beams to the sub-areas 1041, 1042, 1043, and 1044. The ultrasound beams may be reflected from the object 1000 and the receiver 320 may receive a reflection signal.

The ultrasound sensor 300 may determine whether the object 1000 is included in each of the plurality of sub-areas 1041, 1042, 1043, and 1044, based on the reflection signal that is received by the receiver 320. For example, the ultrasound sensor 300 may determine that the object 1000 does not exist in the sub-areas 1041, 1042, and 1044. Also, the ultrasound sensor 300 may determine that the object 1000 exists in the sub-area 1043. Also, the same process may be repeatedly performed on the remaining plurality of sub-areas. The process has already been explained in detail, and thus a detailed explanation thereof will not be given.

Since sub-areas in which an object exists are divided into smaller sub-areas and it is determined whether the object exists in each of the smaller sub-areas, the amount of data processing may be reduced. A data processing time may be reduced due to such recursive data. The data processing time may be compared by obtaining time complexity. The time complexity according to an exemplary embodiment may be obtained by using the master theorem and an explanation thereof will not be given.

FIGS. 11A through 11D are views illustrating sub-areas according to another exemplary embodiment.

Figure 11A:
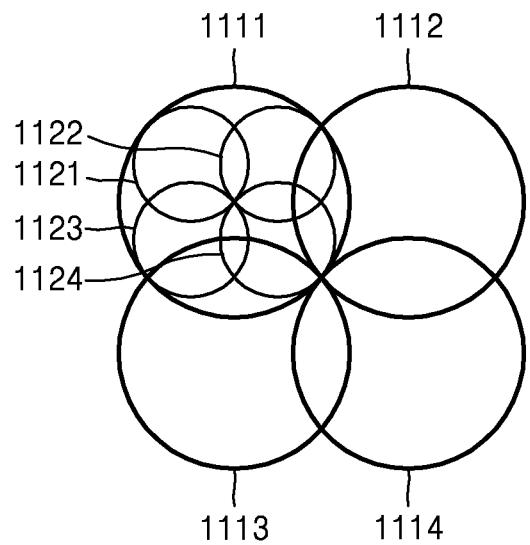
FIGS. 11A through 11D are views illustrating sub-areas according to another exemplary embodiment.

Referring to FIG. 11A, a first area may include first sub-areas 1111, 1112, 1113, and 1114. The first sub-areas 1111, 1112, 1113, and 1114 may have circular shapes. The ultrasound sensor 300 may determine shapes that are previously stored to shapes of the first sub-areas 1111, 1112, 1113, and 1114. Also, the ultrasound sensor 300 may determine shapes of the first sub-areas 1111, 1112, 1113, and 1114 based on a user's input. Also, the ultrasound sensor 300 may determine shapes of the first sub-areas 1111, 1112, 1113, and 1114 based on settings of an electronic device. The first sub-areas 1111, 1112, 1113, and 1114 may have overlapping portions.

Also, as described above with reference to FIGS. 10A through 10C, the first sub-area 1111 including an object may include third sub-areas 1121, 1122, 1123, and 1124. The third sub-areas 1121, 1122, 1123, and 1124 are sub-areas of the first sub-area 1111. The third sub-areas 1121, 1122, 1123, and 1124 have the same shapes and different sizes as and from those of the first sub-areas 1111, 1112, 1113, and 1114.

Referring to FIG. 11A, the controller 330 may control the transmitter 310 to respectively output a plurality of second ultrasound beams to a plurality of third sub-areas that are included in the plurality of first sub-areas 1111, 1112, 1113, and 1114. Also, the controller 330 may determine whether the object is included in each of the plurality of third sub-areas based on a plurality of second reflection signals that are received by the receiver 320. As such, since only sub-areas in which the object exists are divided into smaller sub-areas and it is determined whether the object exists in each of the smaller sub-areas, the amount of data processing may be reduced.

Also, the transmitter 310 may include a plurality of output elements. Also, the transmitter 310 may output a plurality of first ultrasound beams and the plurality of second ultrasound beams by using at least some from among the plurality of output elements. Also, the number of a plurality of output elements that are used to output at least one ultrasound beam from among the plurality of first ultrasound beams may be less than the number of a plurality of output elements that are used to output at least one ultrasound beam from among the plurality of second ultrasound beams.

In detail, the third sub-areas generally have smaller sizes than those of first sub-areas. Also, the second ultrasound beams that are respectively output to the third sub-areas may have a higher resolution than that of the first ultrasound beams that are respectively output to the first sub-areas 1111, 1112, 1113, and 1114. Accordingly, in order to increase a resolution of the second ultrasound beams, the number of a plurality of output elements that are used to output the second ultrasound beams may be greater than the number of a plurality of output elements that are used to output the first ultrasound beams.

Also, as a frequency of an ultrasound beam increases, a maximum distance which the ultrasound beam may reach decreases. Also, as a frequency of an ultrasound beam increases, an area that may be scanned by a single ultrasound beam decreases. Also, as a frequency of an ultrasound beam increases, a scan resolution may increase. Accordingly, in order to increase a resolution of the second ultrasound beams, a frequency of at least one from among the plurality of second ultrasound beams may be higher than a frequency of at least one from among the plurality of first ultrasound beams. In detail, a frequency of an ultrasound beam having a highest frequency from among the plurality of second ultrasound beams may be higher than a frequency of an ultrasound beam having a highest frequency from among the plurality of first ultrasound beams.

Figure 11B:
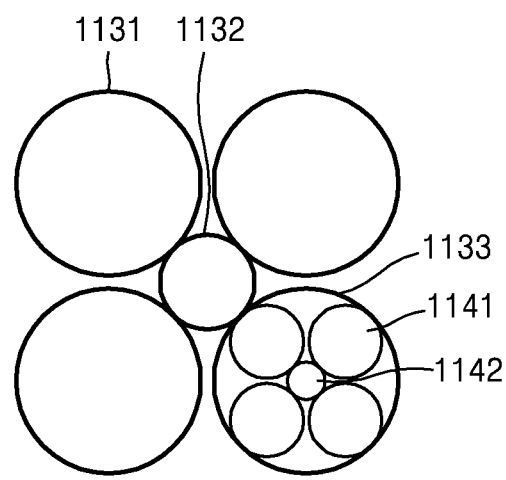
Figure 11C:
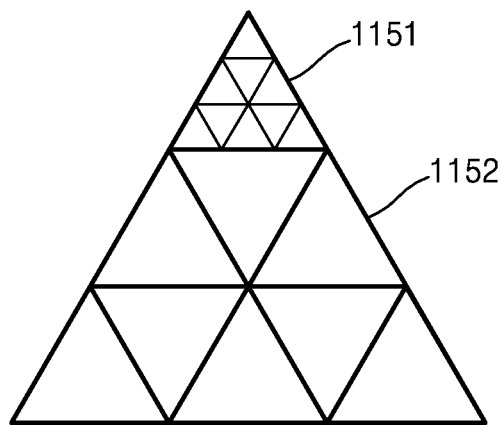
Figure 11D:
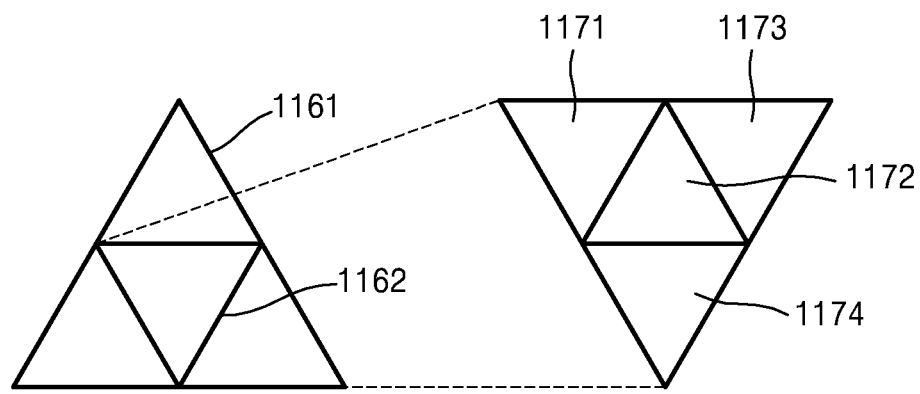

FIGS. 11B through 11D will now be explained and the same description as that already made with reference to FIG. 11A will not be repeated.

Referring to FIG. 11B, a first area may include first sub-areas 1131, 1132, and 1133. The first sub-areas 1131, 1132, and 1133 may have circular shapes. The ultrasound sensor 300 may set shapes that are previously stored to shapes of the first sub-areas 1131, 1132, and 1133. Also, the ultrasound sensor 300 may determine shapes of the first sub-areas 1131, 1132, and 1133 based on a users input. Also, the ultrasound sensor 300 may determine shapes of the first sub-areas 1131, 1132, and 1133 based on settings of an electronic device.

The first sub-areas 1131, 1132, and 1133 may not overlap one another. Also, the first sub-areas 1131, 1132, and 1133 may have different sizes. For example, the first sub-areas 1131 and 1133 may be larger than the first sub-area 1132. When the first sub-area 1132 is smaller, it may mean that the first sub-area 1132 has a higher resolution. In FIG. 11B, the ultrasound sensor 300 may need to precisely detect an object in a central portion of the first area. For example, an icon may be displayed at the central portion.

Also, the first sub-area 1133 including the object may include third sub-areas 1141 and 1142 as described above with reference to FIGS. 10A through 10C. For example, the third sub-areas 1141 and 1142 may have the same shapes and different sizes as and from those of the first sub-areas 1131, 1132, and 1133. For example, the third sub-area 1141 may be larger than the third sub-area 1142.

Referring to FIG. 11C, a first area may include first sub-areas 1151 and 1152. The first sub-areas 1151 and 1152 may have triangular shapes. Also, the first sub-area 1151 including an object may include third sub-areas as described above with reference to FIGS. 10A through 10C. The third sub-areas may have the same shapes and different sizes as and from those of the first sub-area 1151.

Referring to FIG. 11D, a first area may include first sub-areas 1161 and 1162. The first sub-areas 1161 and 1162 may have triangular shapes. Also, the first sub-area 1162 including an object may include third sub-areas 1171, 1172, 1173, and 1174 as described above with reference to FIGS. 10A through 10C. The first sub-area 1162 may have different shapes from those of the third sub-areas 1171, 1172, 1173, and 1174. For example, the first sub-area 1162 has a triangular shape whose lower side is long whereas the third sub-areas 1171, 1172, 1173, and 1174 have triangular shapes whose upper sides are long. The present exemplary embodiment is not limited thereto, and for example, the first sub-area 1162 and the third sub-areas 1171, 1172, 1173, and 1174 may be different from each other in terms of at least one from among shapes and sizes.

Although first sub-areas have been described with reference to FIGS. 11A through 11D, the present exemplary embodiment is not limited thereto and the first sub-areas may have various shapes and sizes. Also, although the first sub-areas of a first area have been described with reference to FIGS. 11A through 11D, the same goes to second sub-areas of a second area of FIGS. 5A through 5C. The description of the second sub-areas is the same as that of the first sub-areas, and thus a repeated explanation thereof will not be given.

Figure 12:
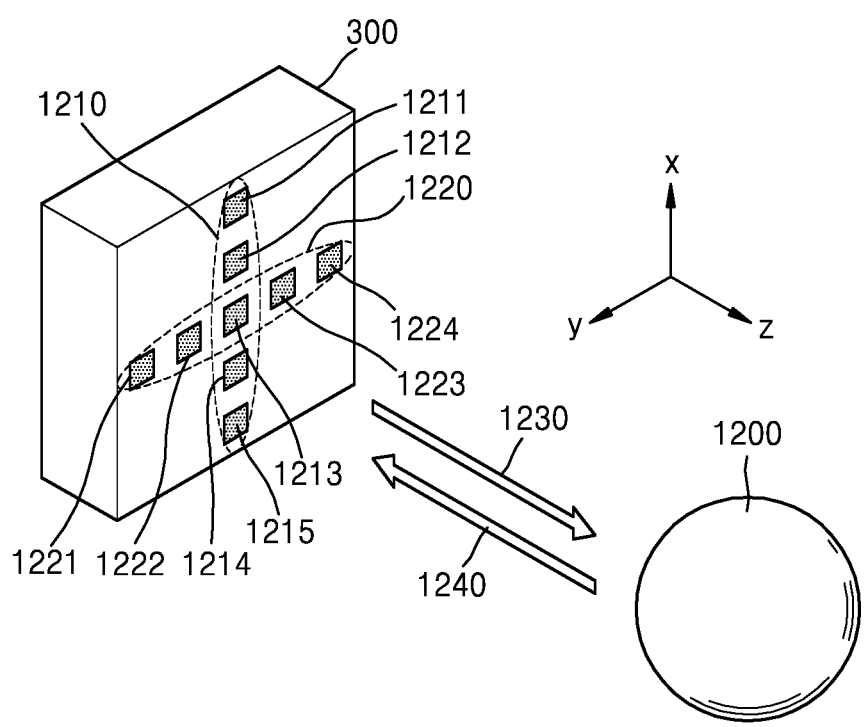
FIG. 12 is a view for explaining how the ultrasound sensor detects an object, according to an exemplary embodiment.
Figure 13:
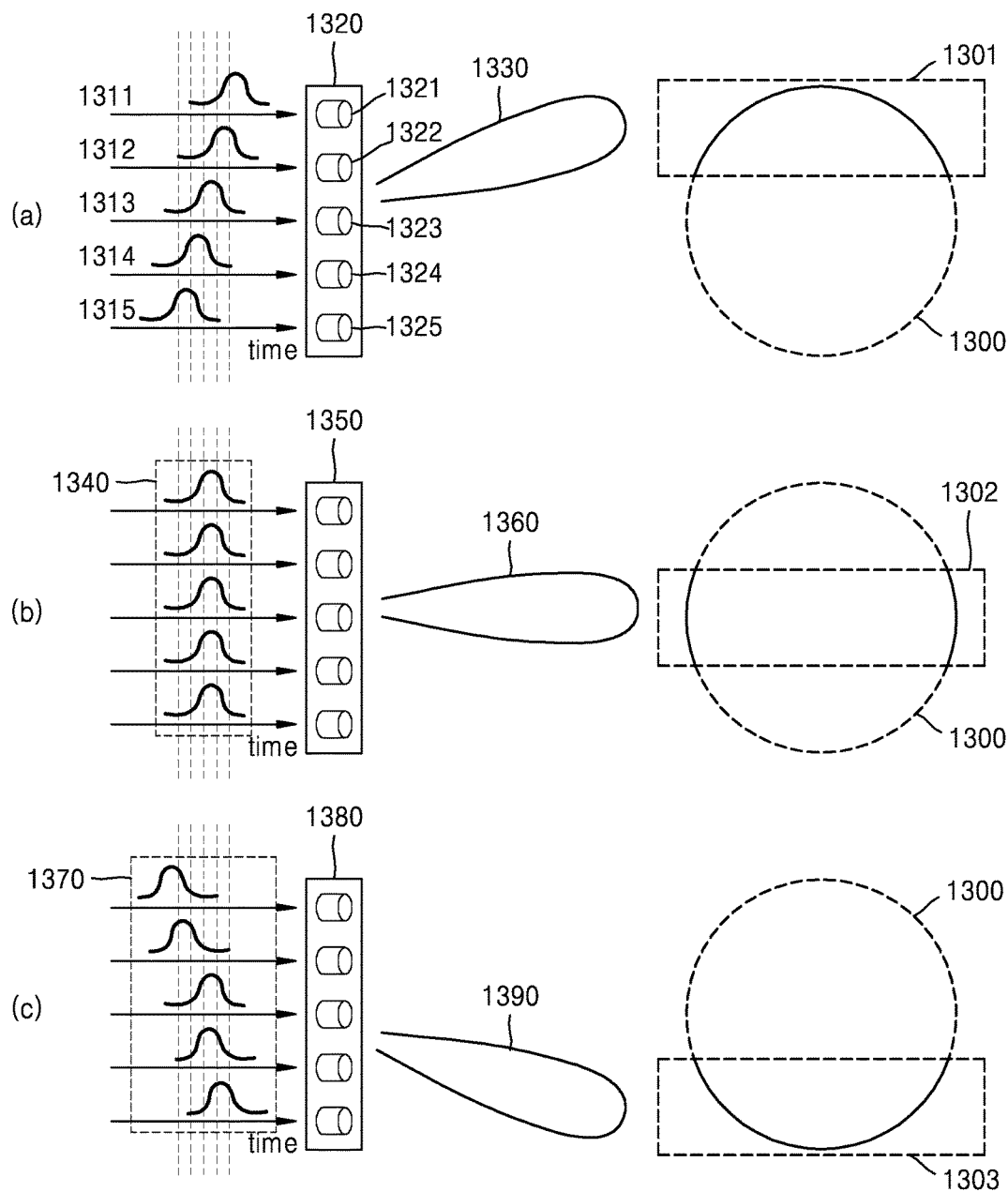
FIGS. 13A through 13C are views for explaining steering of an ultrasound beam, according to an exemplary embodiment.

FIG. 12 is a view for explaining how the ultrasound sensor 300 detects an object 1200, according to an exemplary embodiment.

The ultrasound sensor 300 may include a plurality of piezoelectric elements 1211, 1212, 1213, 1214, 1215, 1221, 1222, 1223, and 1224. The plurality of piezoelectric elements 1211, 1212, 1213, 1214, 1215, 1221, 1222, 1223, and 1224 may be arranged in a cross shape, unlike in FIGS. 4A through 8. One or more piezoelectric elements from among the plurality of piezoelectric elements 1211, 1212, 1213, 1214, 1215, 1221, 1222, 1223, and 1224 may be a plurality of output elements of the transmitter 310. Also, one or more piezoelectric elements from among the plurality of piezoelectric elements 1211, 1212, 1213, 1214, 1215, 1221, 1222, 1223, and 1224 may be a plurality of input elements of the receiver 320.

For example, an arrangement 1210 of piezoelectric elements that are arranged along an x-axis may be an output element array. The output element array may include a plurality of output elements. Also, an arrangement 1220 of piezoelectric elements that are arranged along a y-axis may be an input element array. The input element array may include a plurality of input elements. The output element array may output an ultrasound beam 1230. Also, the object 1200 may reflect the output ultrasound beam 1230. A reflection signal 1240 may be received by the input element array.

The piezoelectric element 1213 may function as an input element and/or an output element. For example, the piezoelectric element 1213 may be used only as an input element or only as an output element. Also, the piezoelectric element 1213 may be used as an input element and then, if necessary, may be used as an output element. In contrast, the piezoelectric element 1213 may be used as an output element and then, if necessary, may be used as an input element.

As described above, an ultrasound beam may be steered by using an arrangement of a plurality of output elements. Steering of an ultrasound beam will now be explained with reference to FIGS. 13A through 13C.

FIGS. 13A through 13C are views for explaining steering of an ultrasound beam, according to an exemplary embodiment.

FIGS. 13A through 13C are views illustrating cases where the transmitter 310 steers ultrasound beams in different directions. Referring to FIG. 13A, the transmitter 310 may include a plurality of output elements 1321, 1322, 1323, 1324, and 1325. The plurality of output elements 1321, 1322, 1323, 1324, and 1325 may be an output element array 1320.

The plurality of output elements 1321, 1322, 1323, 1324, and 1325 may respectively receive pulses 1311, 1312, 1313, 1314, and 1315 that are differently delayed. Also, the plurality of output elements 1321, 1322, 1323, 1324, and 1325 may output ultrasound signals respectively based on the pulses 1311, 1312, 1313, 1314, and 1315. Times at which the pulses 1311, 1312, 1313, 1314, and 1315 are respectively input to the output elements 1321, 1322, 1323, 1324, and 1325 are shown in FIG. 13A. Arrows under the pulses 1311, 1312, 1313, 1314, and 1315 mark time axes. As shown in FIG. 13A, the pulse 1315 is first input to the output element 1325. Next, the pulse 1314 is input to the output element 1324. Last, the pulse 1311 is input to the output element 1321.

The plurality of output elements 1321, 1322, 1323, 1324, and 1325 may output the ultrasound signals respectively based on the pulses 1311, 1312, 1313, 1314, and 1315. As distances between the output elements 1321, 1322, 1323, 1324, and 1325 are close enough, the ultrasound signals that are respectively output at time intervals from the output elements 1321, 1322, 1323, 1324, and 1325 interfere with one another. The interfering ultrasound signals may form an ultrasound beam having a directivity. That is, due to the interference, the output elements 1321, 1322, 1323, 1324, and 1325 may output an ultrasound beam 1330 that is steered. In the above process, the ultrasound sensor 300 outputs the ultrasound beam 1330 to an area 1301 on an object 1300. Accordingly, the ultrasound sensor 300 may detect the area 1301 on the object 1300.

FIGS. 13B and 13C are views illustrating cases where output elements output ultrasound signals at different time intervals and a steered ultrasound beam is output. The same description as that already made with reference to FIGS. 13B and 13C will not be repeated in FIG. 13A.

Referring to FIG. 13B, output elements that are included in an output element array 1350 may respectively receive pulses 1340. Also, the output elements that are included in the output element array 1350 may output ultrasound signals respectively based on the pulses 1340. For example, the output elements may respectively output ultrasound signals having the same phase respectively based on the pulses 1340. The ultrasound signals may interfere with one another. The interfering ultrasound signals may form an ultrasound beam having a directivity. That is, due to the interference, the output element array 1350 may output an ultrasound beam 1360 to an area 1302. That is, the ultrasound sensor 300 may output the ultrasound beam 1360 to the area 1302. Accordingly, the ultrasound sensor 300 may detect the area 1302 on the object 1300.

The ultrasound beam 1360 is output in a direction perpendicular to the output element array 1350 as shown in FIG. 13B. The ultrasound sensor 300 may steer the ultrasound beam 1360 in a middle direction.

Referring to FIG. 13C, output elements that are included in an output element array 1380 may respectively receive pulses 1370. Also, the output elements that are included in the output element array 1380 may output ultrasound signals respectively based on the pulses 1370. For example, the output elements may output ultrasound signals having different phases respectively based on the pulses 1370. The ultrasound signals may interfere with one another. The interfering ultrasound signals may form an ultrasound beam. That is, due to the interference, the output element array 1380 may output an ultrasound beam 1390 that is steered. That is, the ultrasound sensor 300 outputs the ultrasound beam 1390 to an area 1303. Accordingly, the ultrasound sensor 300 may detect the area 1303 on the object 1300.

In FIGS. 13A through 13C, the ultrasound beam 1330, the ultrasound beam 1360, and the ultrasound beam 1390 may interfere with one another. Accordingly, the ultrasound sensor 300 may not simultaneously output the ultrasound beam 1330, the ultrasound beam 1360, and the ultrasound beam 1390, and has to output the ultrasound beams 1330, 1360, and 1390 at predetermined intervals. Accordingly, when the ultrasound sensor 300 detects the object 1300, time delay may occur because a plurality of ultrasound beams are output at predetermined intervals. Accordingly, the inventive concept provides a method of rapidly detecting an object by allowing the ultrasound sensor 300 to simultaneously output a plurality of ultrasound beams.

Figure 14:
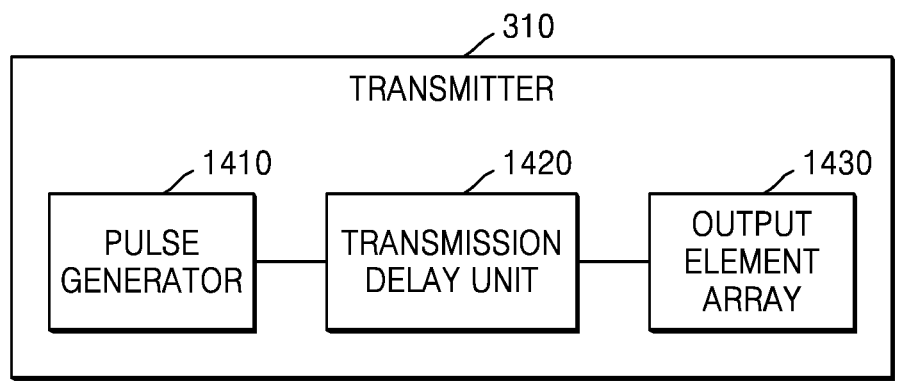
FIG. 14 is a block diagram illustrating a transmitter according to an exemplary embodiment.

FIG. 14 is a block diagram illustrating the transmitter 310 according to an exemplary embodiment.

Referring to FIG. 14, the transmitter 310 may include a pulse generator 1410, a transmission delay unit 1420, and an output element array 1430. The pulse generator 1410 may generate a plurality of pulses having different frequencies corresponding to a plurality of first ultrasound beams. Also, the transmission delay unit 1420 may generate delayed pulses by delaying the pulses by as much as predetermined delay times in order to determine directivities of the plurality of first ultrasound beams. Also, the output element array 1430 may output the plurality of first ultrasound beams based on the delayed pulses. The output element array 1430 includes a plurality of output elements that are linearly arranged, like in FIGS. 13A through 13C.

Figure 15:
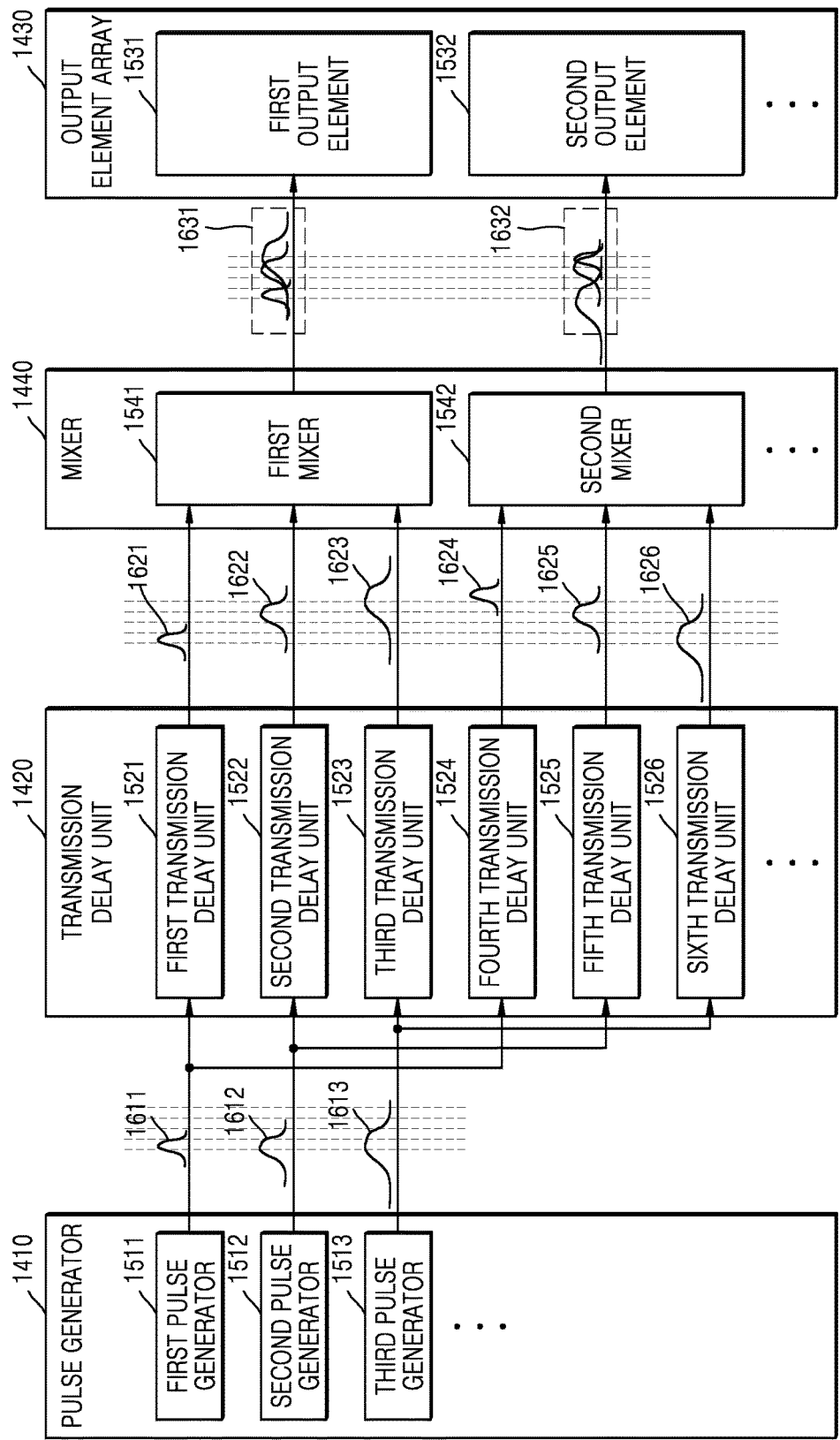
FIG. 15 is a detailed block diagram illustrating the transmitter according to an exemplary embodiment.

FIG. 15 is a detailed block diagram illustrating the transmitter 310 according to an exemplary embodiment.

FIG. 15 is an exemplary embodiment of FIG. 14. Referring to FIG. 15, the pulse generator 1410 may include a plurality of pulse generators including a first pulse generator 1511, a second pulse generator 1512, and a third pulse generator 1513. The pulse generator 1410 may generate a plurality of pulses having different frequencies corresponding to a plurality of first ultrasound beams. The pulse generator 1410 outputs the generated pulses to the transmission delay unit 1420.

Also, the transmission delay unit 1420 may include a plurality of transmission delay units including first through sixth transmission delay units 1521, 1522, 1523, 1524, 1525, and 1526. The transmission delay unit 1420 may output delayed pulses by delaying the pulses by as much as predetermined delay times in order to determine directivities of the first ultrasound beams. Due to the transmission delay unit 1420, the ultrasound beams having different frequencies may have different directivities. For example, a pulse 1611 having a first frequency that is output from the first pulse generator 1511 is input to the first transmission delay unit 1521 and the fourth transmission delay unit 1524. Also, a directivity of an ultrasound beam having the first frequency is determined according to delay times of the first transmission delay unit 1521 and the fourth transmission delay unit 1524. The transmission delay unit 1420 outputs the delayed pulses to a mixer 1440.

The mixer 1440 may include a plurality of mixers including first and second mixers 1541 and 1542. The mixer 1440 mixes the delayed pulses. For example, the first mixer 1541 mixes the delayed pulses that are received from the first transmission delay unit 1521, the second transmission delay unit 1522, and the third transmission delay unit 1523 and outputs a first mixed pulse 1631. The delayed pulses that are received from the first transmission delay unit 1521, the second transmission delay unit 1522, and the third transmission delay unit 1523 are pulses having different frequencies. The mixer 1440 outputs the first mixed pulse 1631 to the output element array 1430.

The output element array 1430 may include a plurality of output elements including first and second output elements 1531 and 1532. The output element array 1430 may output the plurality of first ultrasound beams based on the delayed pulses. For example, the first output element 1531 may receive the first mixed pulse 1631 from the first mixer 1541. The term 'mixed pulse' refers to a pulse obtained by mixing pulses having a plurality of frequencies. The first output element 1531 may output an ultrasound beam based on the first mixed pulse 1631. Due to the transmitter 310 of FIGS. 14 and 15, the ultrasound sensor 300 may simultaneously output ultrasound beams having a plurality of frequencies. Also, the ultrasound sensor 300 may perform steering so that the ultrasound beams having the different plurality of frequencies have different directivities. Accordingly, the ultrasound sensor 30 may simultaneously determine whether an object exists in a plurality of areas.

Referring to FIG. 15, the first pulse generator 1511, the second pulse generator 1512, and the third pulse generator 1513 respectively generate a first pulse 1611, a second pulse 1612, and a third pulse 1613 having different frequencies. The first pulse 1611 is output to the first transmission delay unit 1521 and the fourth transmission delay unit 1524. Also, the second pulse 1612 is output to the second transmission delay unit 1522 and the fifth transmission delay unit 1525. Also, the third pulse 1613 is output to the third transmission delay unit 1523 and the sixth transmission delay unit 1526.

The first transmission delay unit 1521 outputs a first delayed pulse 1621 obtained by delaying the first pulse. The second transmission delay unit 1522 through the sixth transmission delay unit 1526 respectively output second through sixth delayed pulses 1622, 1623, 1624, 1625, and 1627.

In order to determine directivities of the first ultrasound beams, the first through sixth transmission delay units 1521, 1522, 1523, 1524, 1525, and 1526 may respectively output the first through sixth delayed pulses 1621, 1622, 1623, 1624, 1625, and 1626 obtained by differently delaying the first through third pulses 1611, 1612, and 1613. For example, the first transmission delay unit 1521 may output the first delayed pulse 1621 obtained by receiving and delaying the first pulse 1611. Also, the fourth transmission delay unit 1524 may output the fourth delayed pulse 1624 obtained by receiving and delaying the first pulse 1611. The first delayed pulse 1621 and the fourth delayed pulse 1624 may have the same frequency and may have different delay times. The ultrasound sensor 300 may determine a delay time based on a steering angle of an ultrasound beam. The steering angle of the ultrasound beam may be an angle between a central line of the ultrasound beam and the output element array 1430.

The first mixer 1541 may receive the first delayed pulse 1621 through the third delayed pulse 1623 from the first transmission delay unit 1521 through the third transmission delay unit 1523. The first mixer 1541 may mix the first delayed pulse 1621 through the third delayed pulse 1623. Also, the first mixer 1541 may output the first mixed pulse 1631.

The second mixer 1542 may receive the fourth delayed pulse 1624 through the sixth delayed pulse 1626 from the fourth transmission delay unit 1524 through the sixth transmission delay unit 1526. The second mixer 1542 may mix the fourth delayed pulse 1624 through the sixth delayed pulse 1626. Also, the second mixer 1542 may output a second mixed pulse 1632. The first mixed pulse 1631 includes pulses having different frequencies. Also, the second mixed pulse 1632 includes pulses having different frequencies.

The first output element 1531 may receive the first mixed pulse 1631 and may output an ultrasound signal. Also, the second output element 1532 may receive the second mixed pulse 1632 and may output an ultrasound signal. The ultrasound signals may be independent from each other. For example, when a first frequency from among different frequencies is not an integer number times a second frequency from among the different frequencies, it may be assumed that the first frequency and the second frequency are independent from each other. Independent ultrasound signals from among the ultrasound signals that are output from the first output element 1531 and ultrasound signals that are output from the second output element 1532 do not interfere with each other. However, ultrasound signals that are not independent from each other may interfere with each other. When ultrasound signals interfere with each other, an ultrasound beam having a directivity may be generated as described above with reference to FIGS. 13A through 13C. Unlike in FIGS. 13A through 13C, a plurality of ultrasound beams have a plurality of different frequencies and thus may be simultaneously output in FIG. 15. Accordingly, the ultrasound sensor 300 may simultaneously scan a plurality of areas. The ultrasound sensor 300 that scans a plurality of areas will be explained below in more detail with reference to FIG. 19.

Figure 16:
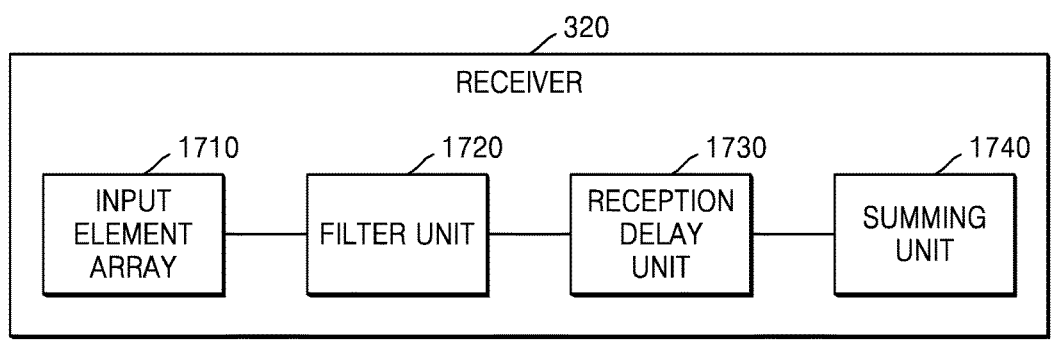
FIG. 16 is a block diagram illustrating a receiver according to an exemplary embodiment.

FIG. 16 is a block diagram illustrating the receiver 320 according to an exemplary embodiment.

The receiver 320 may receive a first reflection signal that is reflected from an object in response to a plurality of first ultrasound beams. Also, the receiver 320 may divide the first reflection signal according to frequencies by using frequency division. Also, the receiver 320 may sum signals having the same frequency from among the signals that are divided according to frequencies.

Referring to FIG. 16, the receiver 320 may include an input element array 1710, a filter unit 1720, a reception delay unit 1730, and a summing unit 1740. Also, the first reflection signal may include a third reflection signal and a fourth reflection signal. The input element array 1710 may include a first input element that receives the third reflection signal and a second input element that receives the fourth reflection signal. Also, the filter unit 1720 may generate first divided signals by dividing the third reflection signal according to different frequencies. Also, the filter unit 1720 may generate second divided signals by dividing the fourth reflection signal according to different frequencies. Also, the reception delay unit 1730 may generate first delayed signals by delaying reception of the first divided signals based on frequencies of the first divided signals. Also, the reception delay unit 1730 may generate second delayed signals by delaying reception of the second divided signals based on frequencies. Also, the summing unit 1740 may sum signals having the same frequency from among the first delayed signals and the second delayed signals. The receiver 320 will now be explained in more detail with reference to FIG. 17.

Figure 17:
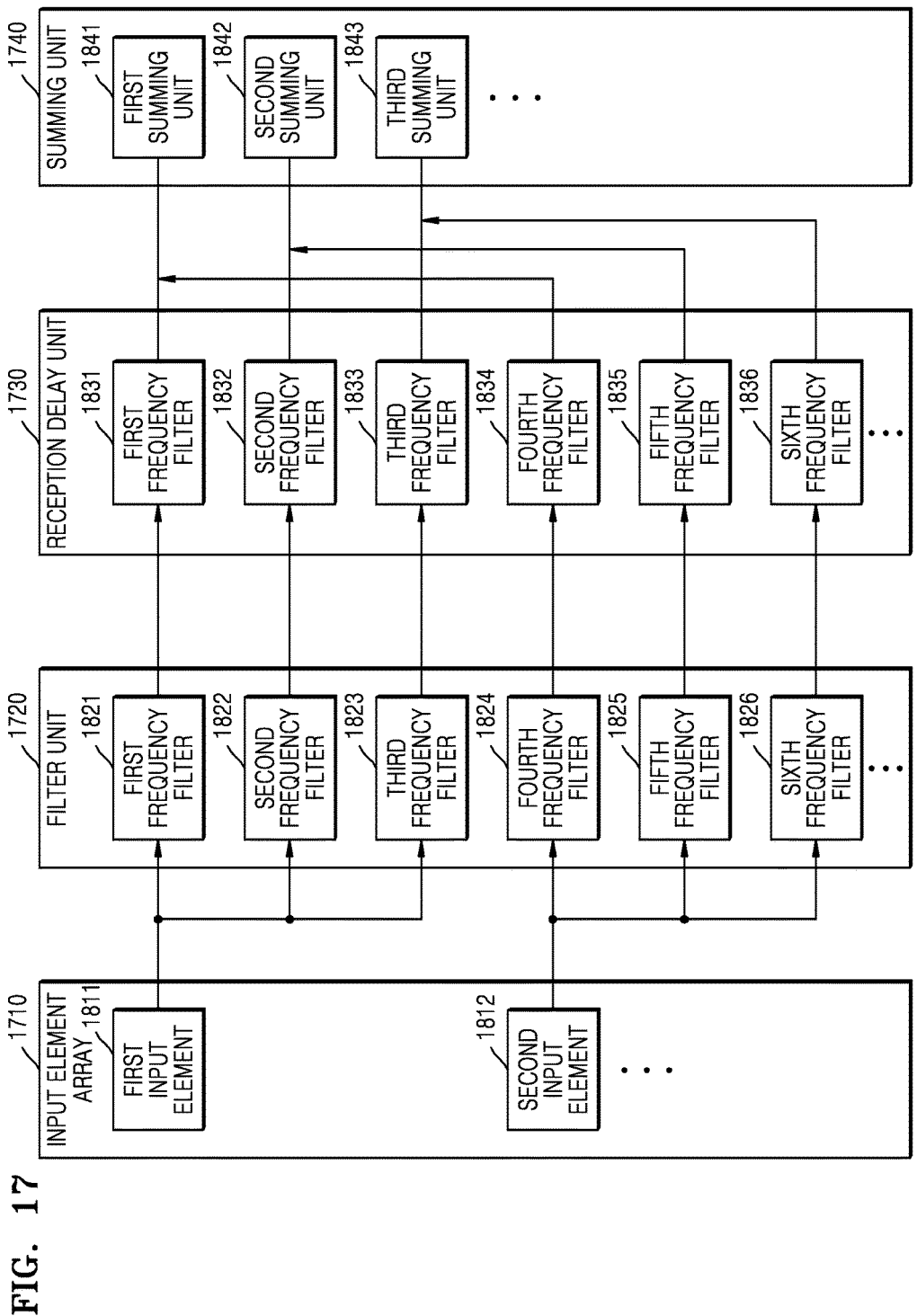
FIG. 17 is a detailed block diagram illustrating the receiver according to an exemplary embodiment.

FIG. 17 is a detailed block diagram illustrating the receiver 320 according to an exemplary embodiment.

FIG. 17 may be an exemplary embodiment of FIG. 16. Referring to FIG. 17, the input element array 1710 may include a plurality of input elements including a first input element 1811 and a second input element 1812. The input element array 1710 may receive a first reflection signal that is reflected from an object. For example, the first reflection signal may include a third reflection signal and a fourth reflection signal. The first input element 1811 may receive the third reflection signal. Also, the second input element 1812 may receive the fourth reflection signal.

As described above with reference to FIGS. 14 through 16, the transmitter 310 may output first ultrasound beams having a plurality of frequencies. Since the first reflection signals are ultrasound beams that are obtained by reflecting the first ultrasound beams from the object, the first reflection signals may be signals having a plurality of frequencies.

The filter unit 1720 may receive signals from the input element array 1710. The signal that is received from the first input element 1811 may be input to a first frequency filter 1821, a second frequency filter 1822, and a third frequency filter 1823. Also, the signal that is received from the second input element 1812 may be input to a fourth frequency filter 1824, a fifth frequency filter 1825, and a sixth frequency filter 1826.

The filter unit 1720 may divide a reflection signal according to frequencies. For example, the first frequency filter 1821 and the fourth frequency filter 1824 may be band-pass filters that may separate the same frequency. Accordingly, the first frequency filter 1821 may output a first filtered signal that is obtained by separating a signal having a predetermined frequency from the third reflection signal that is received from the first input element 1811. Also, the fourth frequency filter 1824 may output a fourth filtered signal that is obtained by separating a signal having the predetermined frequency from the fourth reflection signal that is received from the second input element 1812.

Likewise, the second frequency filter 1822 and the fifth frequency filter 1825 may be band-pass filters that may separate the same frequency. Also, the third frequency filter 1823 and the sixth frequency filter 1823 may be band-pass filters that may separate the same frequency. The second frequency filter 1822, the third frequency filter 1823, the fifth frequency filter 1825, and the sixth frequency filter 1826 may respectively output a second filtered signal, a third filtered signal, a fifth filtered signal, and a sixth filtered signal, as described above in detail.

Also, the reception delay unit 1730 may receive filtered signals from the filter unit 1720. For example, a first reception delay unit 1831 may receive the first filtered signal from the first frequency filter 1821. Also, a fourth reception delay unit 1834 may receive the fourth filtered signal from the fourth frequency filter 1824. Also, the first reception delay unit 1831 may output a first delayed signal that is obtained by delaying the first filtered signal. Also, the fourth reception delay unit 1834 may output a fourth delayed signal that is obtained by delaying the fourth filtered signal. The reception delay unit 1730 may cause phases of the first delayed signal and the fourth delayed signal to correspond to each other.

Operations of the second reception delay unit 1832, the third reception delay unit 1833, the fifth reception delay unit 1835, and the sixth reception delay unit 1836 are the same as operations of the first reception delay unit 1831 and the fourth reception delay unit 1834, and thus a detailed explanation thereof will not be given. Also, the second reception delay unit 1832 may output a second delayed signal. Also, the third reception delay unit 1833 may output a third delayed signal. Also, the fifth reception delay unit 1835 may output a fifth delayed signal. Also, the sixth reception delay unit 1836 may output a sixth delayed signal.

Also, the summing unit 1740 may include a plurality of summing units including first summing unit 1841, a second summing unit 1842, and a third summing unit 1843. The first summing unit 1841 may sum the first delayed signal and the fourth delayed signal that are respectively output from the first reception delay unit 1831 and the fourth reception delay unit 1834. The first delayed signal and the fourth delayed signal may have the same frequency. Also, the second summing unit 1842 may sum the second delayed signal and the fifth delayed signal. Also, the third summing unit 1843 may sum the third delayed signal and the sixth delayed signal.

Figure 18:
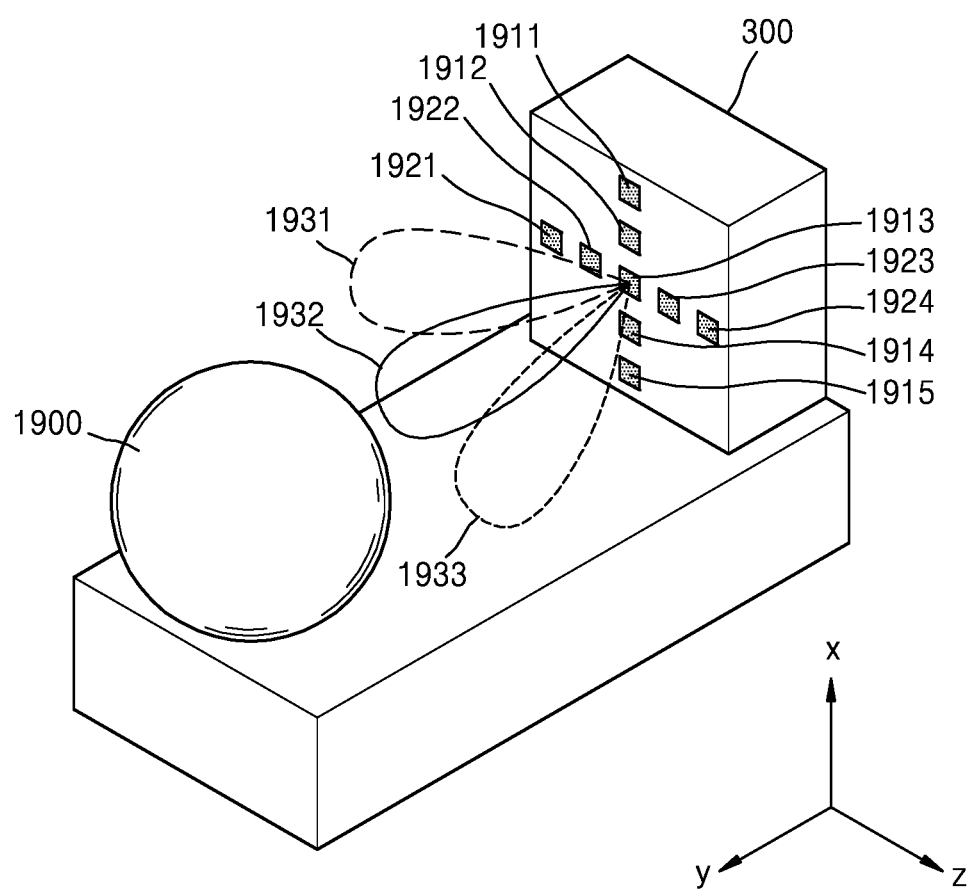
FIG. 18 is a view for explaining an operation of the ultrasound sensor, according to another exemplary embodiment.

FIG. 18 is a view for explaining an operation of the ultrasound sensor 300, according to another exemplary embodiment.

According to an exemplary embodiment, the transmitter 310 may include an output element array including a plurality of output elements that vibrate according to an electrical signal transmitted thereto to generate ultrasound and are linearly arranged. Also, the receiver 320 may include an input element array including a plurality of input elements that receive a reflection signal and convert the reflection signal into an electrical signal, and are linearly arranged. Also, the output element array and the input element array may be arranged not to be parallel to each other.

Also, according to another exemplary embodiment, the output element array and the input element array may be arranged to be perpendicular to each other.

Referring to FIG. 18, the ultrasound sensor 300 may include a plurality of piezoelectric elements 1911, 1912, 1913, 1914, 1915, 1921, 1922, 1923, and 1924. At least one from among the plurality of piezoelectric elements 1911, 1912, 1913, 1914, 1915, 1921, 1922, 1923, and 1924 may be included in the transmitter 310. Also, the remaining piezoelectric elements may be included in the receiver 320.

A piezoelectric element may function as an input element and/or an output element as described above. For example, a piezoelectric element may be used only as an input element or may be used only as an output element. Also, a piezoelectric element may be used as an input element and then, if necessary, may be used as an output element. In contrast, a piezoelectric element may be used as an output element and then, if necessary, may be used as an input element.

FIG. 18 illustrates a case where the piezoelectric elements 1911, 1912, 1913, 1914, and 1915 that are arranged along an x-axis are output elements. An arrangement of the output elements 1911, 1912, 1913, 1914, and 1915 is an output element array. Also, FIG. 18 illustrates a case where the piezoelectric elements 1921, 1922, 1923, and 1924 that are arranged along a z-axis are input elements. An arrangement of the input elements 1921, 1922, 1923, and 1924 is an input element array.

The output element array and the input element array may be arranged not to be parallel to each other. Also, the output element array and the input element may be arranged to be perpendicular to each other. For example, the output element array and the input element array may be arranged in a cross shape as shown in FIG. 18. Also, like in FIG. 8, the output element array and the input element array may be arranged in a "┐" shape or a "└" shape. Also, the output element array and the input element array may be arranged in a quadrangular shape.

Ultrasound beams 1931, 1932, and 1933 may be output based on the output element array. The ultrasound beams 1931, 1932, and 1933 may have different frequencies. Also, the ultrasound beams 1931, 1932, and 1933 may have different steering angles. A steering angle of an ultrasound beam may be an angle between a central line of the ultrasound beam and the output element array. For example, an angle between a y-z plane and an ultrasound beam is a steering angle of the ultrasound beam. The ultrasound beams 1931, 1932, and 1933 may be simultaneously output. The ultrasound beams 1931, 1932, and 1933 are reflected from an object 1900 and a reflection signal is received by the receiver 320. The ultrasound sensor 300 may simultaneously determine whether the object 1900 exists in a plurality of areas.

Figure 19:
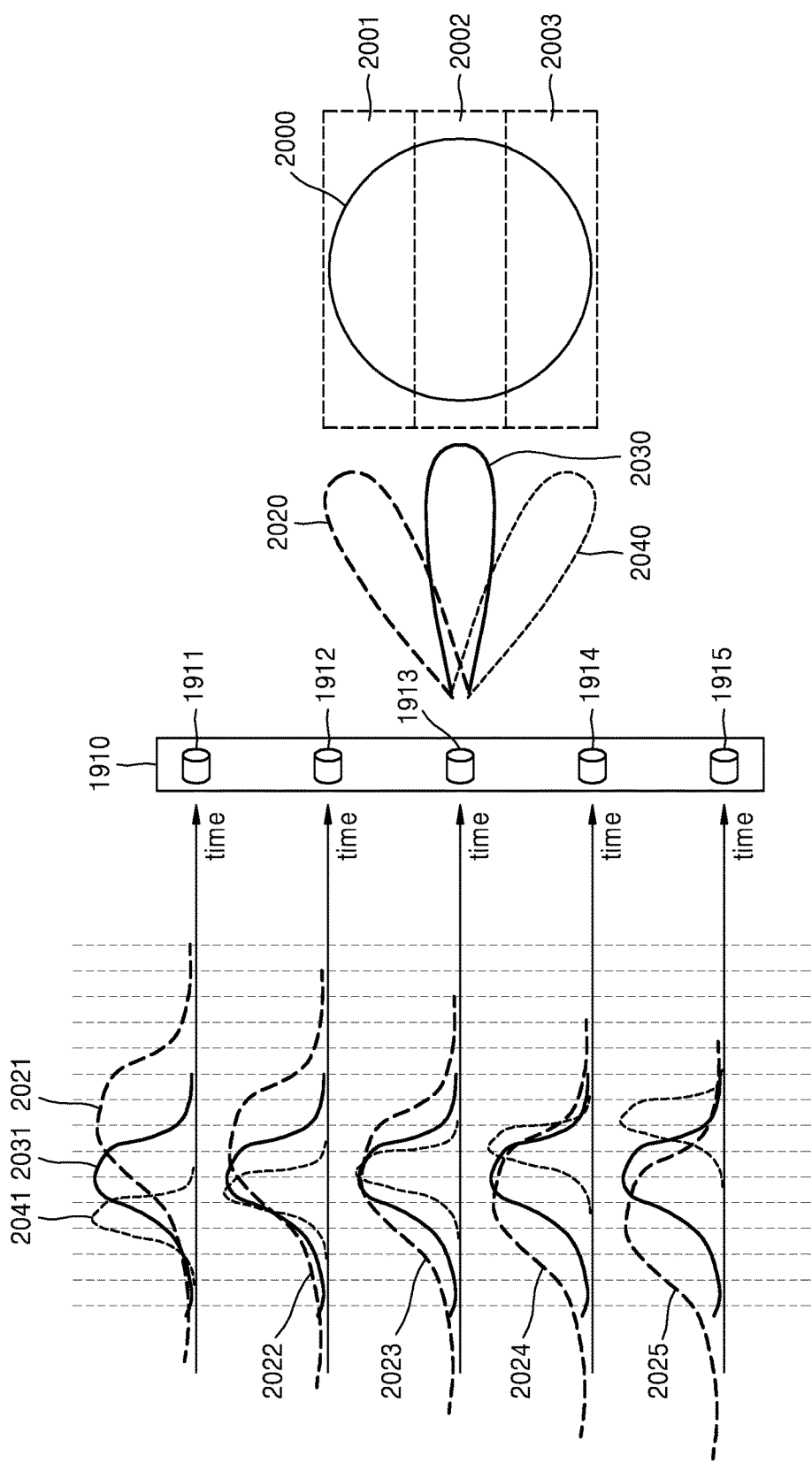
FIG. 19 is a view for explaining steering of an ultrasound beam, according to another exemplary embodiment.

FIG. 19 is a view for explaining steering of an ultrasound beam, according to another exemplary embodiment.

The transmitter 310 may include an output element array 1910 including the plurality of output elements 1911, 1912, 1913, 1914, and 1915 that are linearly arranged. The first output element 1911 may receive pulses 2041, 2042, and 2043 having different frequencies. Time axes are shown under the pulses 2041, 2042, and 2043. That is, as time passes, the output element 1911 may first receive the pulse 2041 having a first frequency. Next, the output element 1911 may receive a pulse 2031 having a second frequency. Last, the output element 1911 may receive a pulse 2021 having a third frequency. Also, the first output element 1911 may output a mixed ultrasound signal based on the pulses 2041, 2042, and 2043 having different frequencies.

Also, the output element 1912 may receive a pulse 2022 having the third frequency. Also, the output element 1913 may receive a pulse 2023 having the third frequency. Also, the output element 1914 may receive a pulse 2024 having the third frequency. Also, the output element 1915 may receive a pulse 2025 having the third frequency.

Referring to FIG. 19, the output element array 1910 receives pulses in an order of the pulse 2025, the pulse 2024, the pulse 2023, the pulse 2022, and the pulse 2021. The output element array 1910 outputs an ultrasound signal based on the received pulses. The ultrasound signals having the third frequency interfere with one another. The interfering ultrasound signals may form a steered ultrasound beam. That is, the output element array 1910 outputs a steered ultrasound beam 2020 having the third frequency.

The output element array 1910 may output steered ultrasound beams 2030 and 2040. How the output element array 1910 outputs the steered ultrasound beams 2030 and 2040 is similar to a process of outputting the steered ultrasound beam 2020, and thus a detailed explanation thereof will not be given. Since the steered ultrasound beams 2020, 2030, and 2040 have different frequencies and thus do not interfere with one another, the steered ultrasound beams 2020, 2030, and 2040 may be simultaneously output.

Also, since the steered ultrasound beams 2020, 2030, and 2040 are steered at different angles, the steered ultrasound beams 2020, 2030, and 2040 may be applied to a plurality of different areas. For example, the steered ultrasound beam 2020 may be applied to an area 2001 of an object 2000. Also, the steered ultrasound beam 2030 may be applied to an area 2002 of the object 2000. Also, the steered ultrasound beam 2040 may be applied to an area 2003 of the object 2000. Accordingly, the ultrasound sensor 300 may simultaneously determine whether the object 2000 exists in the plurality of areas 2001, 2002, and 2003.

Figure 20:
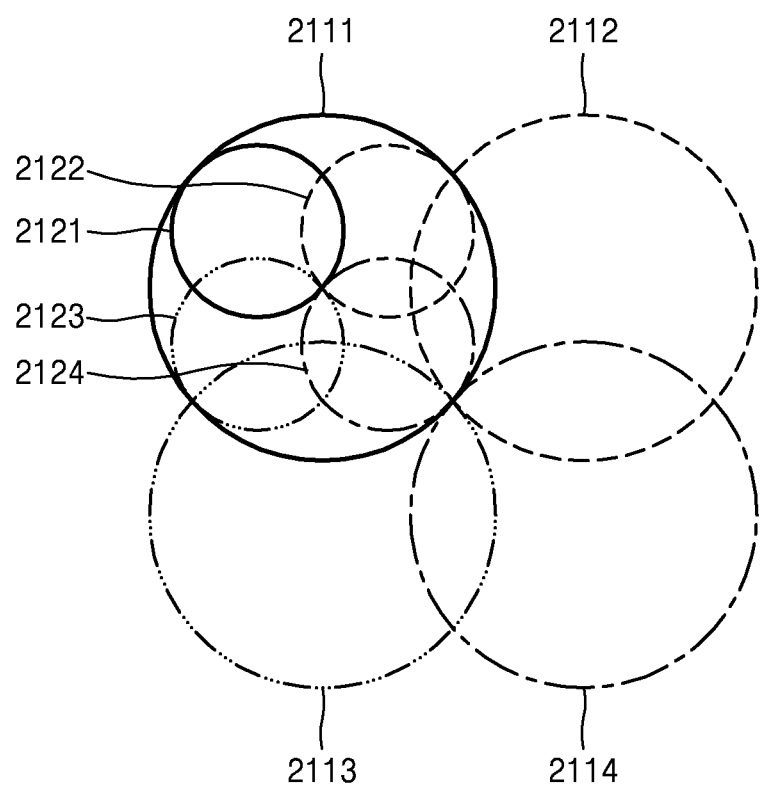
FIG. 20 is a view illustrating sub-areas according to another exemplary embodiment.

FIG. 20 is a view illustrating sub-areas according to another exemplary embodiment.

In FIGS. 10A through 11D, the ultrasound sensor 300 divides a first area into first sub-areas and outputs an ultrasound beam to the sub-areas. According to an exemplary embodiment, in FIG. 20, the ultrasound sensor 300 may simultaneously output ultrasound beams having different frequencies to a plurality of areas based on a technology described above with reference to FIGS. 14 through 19. For example, the ultrasound sensor 300 may output ultrasound beams having different frequencies to areas 2111, 2112, 2113, and 2114. For example, the ultrasound sensor 300 may output an ultrasound beam having a first frequency to the area 2111. Also, the ultrasound sensor 300 may output an ultrasound beam having a second frequency to the area 2112. Also, the ultrasound sensor 300 may output an ultrasound beam having a third frequency to the area 2113. Also, the ultrasound sensor 300 may output an ultrasound beam having a fourth frequency to the area 2114.

Also, when it is detected that an object exists in the area 2111, the ultrasound sensor 300 may output an ultrasound beam having a fifth frequency to a sub-area 2121. Also, the ultrasound sensor 300 may output an ultrasound beam having a sixth frequency to a sub-area 2122. Also, the ultrasound sensor 300 may output an ultrasound beam having a seventh frequency to a sub-area 2123. Also, the ultrasound sensor 300 may output an ultrasound beam having an eighth frequency to a sub-area 2124.

Frequencies of the ultrasound beams that are output by the ultrasound sensor 300 to the areas 2111, 2112, 2113, and 2114 may be lower than frequencies of the ultrasound beams that are output by the ultrasound sensor 300 to the sub-areas 2121, 2122, 2123, and 2124. In detail, a highest frequency from among the frequencies of the ultrasound beams that are output by the ultrasound sensor 300 to the areas 2111, 2112, 2113, and 2114 may be lower than a highest frequency from among the frequencies of the ultrasound beams that are output by the ultrasound sensor 300 to the sub-areas 2121, 2122, 2123, and 2124. Accordingly, resolutions of the sub-areas 2121, 2122, 2123, and 2124 may be increased. For example, the fifth frequency that is a highest frequency from among the fifth frequency through the eighth frequency may be higher than the first frequency that is a highest frequency from among the first frequency through the fourth frequency.

The transmitter 310 may include a plurality of output elements. The transmitter 310 may output an ultrasound beam to the areas 2111, 2112, 2113, and 2114 by using at least some output elements from among the plurality of output elements. Also, the transmitter 310 may output an ultrasound beam to the sub-areas 2121, 2122, 2123, and 2124 by using at least some output elements from among the plurality of output elements. The number of a plurality of output elements that are used to output the ultrasound beam to the areas 2111, 2112, 2113, and 2114 may be less than the number of a plurality of output elements that are used to output the ultrasound beam to the sub-areas 2121, 2122, 2123, and 2124. Accordingly, resolutions of the sub-areas 2121, 2122, 2123, and 2124 may be increased.

An object detecting method of the ultrasound sensor 300 will now be explained and the same description as that already made with reference to FIG. 3 will not be repeated in FIG. 21.

Figure 21:
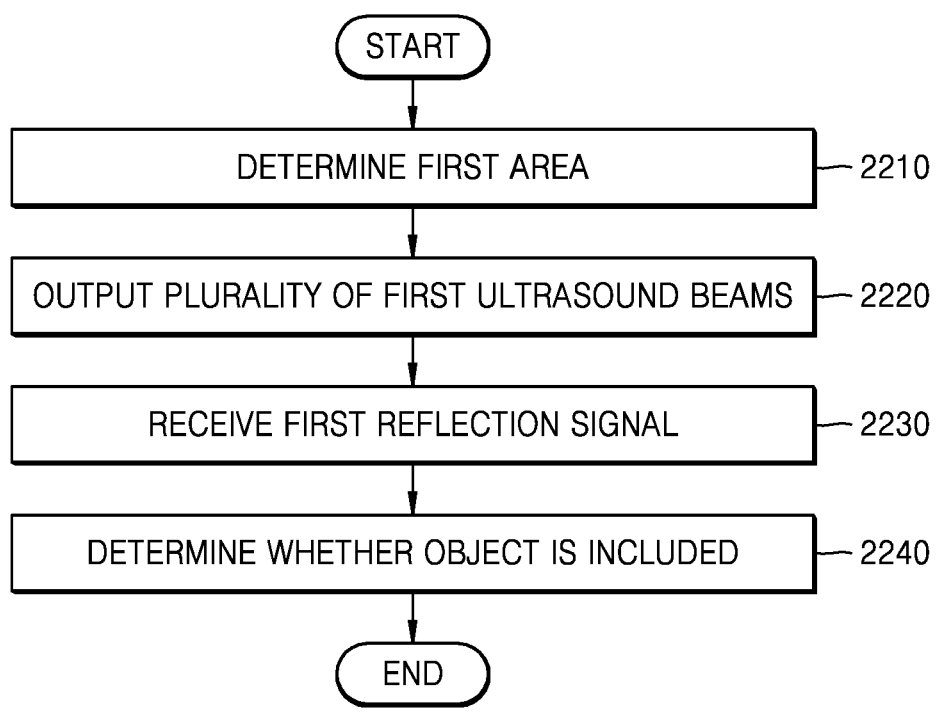
FIG. 21 is a flowchart of an object detecting method of the ultrasound sensor, according to an exemplary embodiment.

FIG. 21 is a flowchart of an object detecting method of the ultrasound sensor 300, according to an exemplary embodiment.

The object detecting method of FIG. 21 may be performed by the ultrasound sensor 300 of FIG. 3. The method of FIG. 21 will now be explained along with the ultrasound sensor 300 of FIG. 3.

Operation 2210 may be performed by the controller 330. Also, operation 2220 may be performed by the transmitter 310. Also, operation 2230 may be performed by the receiver 320. Also, operation 2240 may be performed by the controller 330.

In operation 2210, the ultrasound sensor 300 according to an exemplary embodiment may determine a first area in a space. In operation 2210, the ultrasound sensor 300 according to an exemplary embodiment may respectively output a plurality of first ultrasound beams to a plurality of first sub-areas that are included in the first area. In operation 2230, the ultrasound sensor 300 according to an exemplary embodiment may receive a first reflection signal that is output when the output plurality of first ultrasound beams are reflected from an object. In operation 2240, the ultrasound sensor 300 according to an exemplary embodiment may determine whether the object is included in each of the plurality of first sub-areas based on the first reflection signal.

The ultrasound sensor 300 may be organically connected to an electronic device and may perform an operation of detecting the object in the electronic device. Also, the ultrasound sensor 300 may not be connected to another electronic device and may independently perform an operation of detecting the object.

The first area may be an area that is scanned by the ultrasound sensor 300. Also, the first area is an area where the object is estimated to exist. Also, the first area may be an area whose dimension varies according to the electronic device in which the ultrasound sensor 300 is mounted. Examples of the first area may include a 3D area. The area that may be scanned by the ultrasound sensor 300 may be determined by an area where the transmitter 310 may output an ultrasound beam. The first area may be a part of the area that may be scanned by the ultrasound sensor 300. The first area may be determined based on a virtual screen that is provided by the electronic device. Also, the ultrasound sensor 300 may obtain a point of the object that is the closest to the ultrasound sensor 300 and the controller 330 may determine the first area based on the point.

Also, a first output device of the transmitter 310 may vibrate according to an electrical signal and may output an ultrasound beam for determining the first area. The receiver 320 may receive a reflection signal for determining the first area that is output when the ultrasound beam for determining the first area is reflected from the object. The controller 330 may obtain a first point of the object that is the closest to the first output element based on the reflection signal for determining the first area. Also, the controller 330 may determine the first area that includes the first point.

Also, a second output device of the transmitter 310 may output an ultrasound beam for determining a second area. The receiver 320 may receive a reflection signal for determining the second area that is output when the ultrasound beam for determining the second area is reflected from the object. The controller 330 may obtain a second point of the object that is the closest to the second output element based on the reflection signal for determining the second area. Also, the controller 330 may determine the second area that includes the second point.

Also, the transmitter 310 may respectively output the plurality of first ultrasound beams to a plurality of second sub-areas that are included in the second area. The controller 330 may determine whether the object is included in each of the plurality of second sub-areas based on the first reflection signal.

Also, the ultrasound sensor 300 may be used in the electronic device. The controller 330 may include a communication interface that communicates with the electronic device in which the ultrasound sensor 300 is mounted. Accordingly, the ultrasound sensor 300 may be organically connected to the electronic device, and may perform an operation of detecting the object. The controller 330 may determine the first area based on a UI that is provided by the electronic device in the space.

The first area may include the plurality of first sub-areas. The controller 330 may divide the first area into the first sub-areas. The plurality of first sub-areas may have overlapping portions. The first sub-areas may have different sizes. Since a resolution creases as sizes of the first sub-areas decrease, a first sub-area having a small size may be an area including important information. The first sub-areas may be further divided into a plurality of smaller sub-areas.

Also, the controller 330 may determine at least one from among sizes, positions, and shapes of the plurality of first sub-areas based on the UI.

Also, the transmitter 310 may respectively output the plurality of second ultrasound beams to a plurality of third sub-areas that are included in the first sub-areas. The receiver 320 may receive a second reflection signal that is output when the plurality of second ultrasound beams are reflected from the object. The controller 330 may determine whether the object is included in each of the plurality of third sub-areas based on the second reflection signal.

Also, the transmitter 310 may include a plurality of output elements. The transmitter 310 may output the plurality of first ultrasound beams and the plurality of second ultrasound beams by using at least some output elements from among the plurality of output elements. The controller 330 may control the number of a plurality of output elements that are used to output at least one ultrasound beam from among the plurality of first ultrasound beams to be less than the number of a plurality of output elements that are used to output at least one ultrasound beam from among the plurality of second ultrasound beams.

Also, the controller 330 may control a frequency of an ultrasound beam having a highest frequency from among the plurality of first ultrasound beams to be lower than a frequency of an ultrasound beam having a highest frequency from among the plurality of second ultrasound beams.

Figure 22:
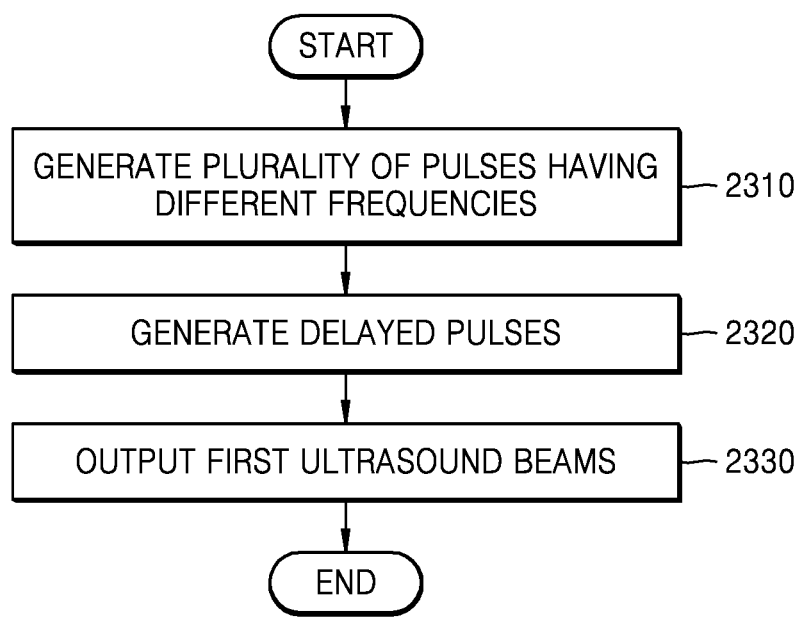
FIG. 22 is a flowchart of an operation of the transmitter, according to an exemplary embodiment.

FIG. 22 is a flowchart of an operation of the transmitter 310, according to an exemplary embodiment.

The operation of FIG. 22 may be performed by the transmitter 310 of FIG. 14. The operation of FIG. 22 will now be explained along with the transmitter 310 of FIG. 16.

Operation 2310 may be performed by the pulse generator 1410. Operation 2320 may be performed by the transmission delay unit 1420. Operation 2330 may be performed by the output element array 1430.

In operation 2310, the ultrasound sensor 300 according to an exemplary embodiment may generate a plurality of pulses having different frequencies corresponding to a plurality of first ultrasound beams. Also, in operation 2320, the ultrasound sensor 300 may generate delayed pulses by delaying the pulses by as much as predetermined delay times in order to determine directivities of the plurality of first ultrasound beams. Also, in operation 2330, the ultrasound sensor 300 according to an exemplary embodiment may output the plurality of first ultrasound beams based on the delayed pulses.

Figure 23:
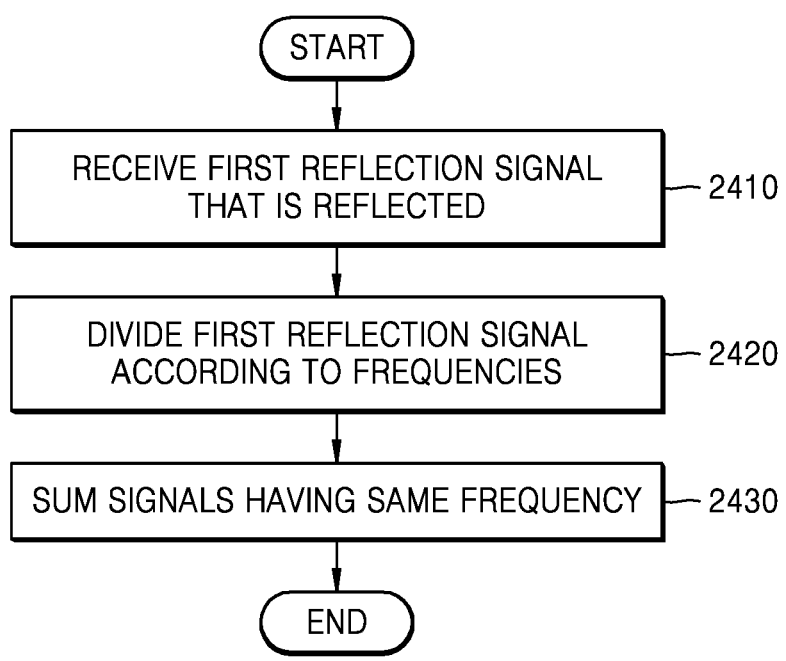
FIG. 23 is a flowchart of an operation of the receiver, according to an exemplary embodiment.

FIG. 23 is a flowchart of an operation of the receiver 320, according to an exemplary embodiment.

The operation of FIG. 23 may be performed by the receiver 320 of FIG. 16. The operation of FIG. 23 will now be explained along with the receiver 320 of FIG. 16.

Operation 2410 may be performed by the input element array 1710. Operation 2420 may be performed by the filter unit 1720. Operation 2430 may be performed by the summing unit 1740.

In operation 2410, the ultrasound sensor 300 according to an exemplary embodiment may receive a first reflection signal that is reflected from an object in response to first ultrasound beams. Also, in operation 2420, the ultrasound sensor 300 according to an exemplary embodiment may divide the first reflection signal according to frequencies. Also, in operation 2430, the ultrasound sensor 300 according to an exemplary embodiment may sum signals having the same frequency from among the signals that are divided according to frequencies.

Also, the first reflection signal may include a third reflection signal and a fourth reflection signal. Operation 2410 in which the input element array 1710 receives the first reflection single may include an operation in which the third reflection signal is received. Also, operation 2410 in which the input element array 1710 receives the first reflection signal may include an operation in which the fourth reflection signal is received.

Also, operation 2420 in which the filter unit 1720 divides the first reflection single according to frequencies may include an operation in which the third reflection signal is divided according to different frequencies and first divided signals are generated. Also, operation 2420 in which the filter unit 1720 divides the first reflection signal according to frequencies may include an operation in which the sixth reflection signal is divided according to different frequencies and second divided signals are generated.

Also, the ultrasound sensor 300 may generate first delayed signals by delaying reception of the first divided signals based on frequencies of the first divided signals. Also, the ultrasound sensor 300 may generate second delayed signals by delaying reception of the second divided signals based on frequencies.

Also, the ultrasound sensor 300 may sum signals having the same frequency from among the first delayed signals and the second delayed signals.

According to an exemplary embodiment, in order to achieve the afore-described objectives, a program for executing the object detecting method of the ultrasound sensor 300 of FIGS. 21 through 23 may be recorded on a computer-readable recording medium.

As described above, according to the one or more of the above exemplary embodiments, the ultrasound sensor 300 may perform an ultrasound scan on an area where an object is estimated to exist. Also, the ultrasound sensor 300 may divide the area where the object is estimated to exist into sub-areas and may process the sub-areas. Also, the ultrasound sensor 300 may simultaneously scan a plurality of sub-areas by using a plurality of ultrasound beams having different frequencies. Accordingly, the ultrasound sensor 300 may rapidly and accurately detect the object.

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a digital signal processor (DSP) and a microprocessor, a plurality of microprocessors, one or more microprocessors in conjunction with a digital signal processor (DSP) core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. A memory is said to be in electronic communication with a processor if the processor can read information from and/or write information to the memory. A memory that is integral to a processor is in electronic communication with the processor.

The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may include a single computer-readable statement or many computer-readable statements.

In one or more exemplary embodiments, the operations described herein may be implemented in hardware, software, firmware or any combination thereof. If implemented in software, such operations may be stored on or transmitted over a computer-readable medium as one or more instructions or code. The term "computer-readable medium" or "computer-program product" refers to any medium that may be accessed by using a computer. By way of example, and not limitation, computer-readable storage media may include an array of storage elements, such as RAM, ROM, EEPROM, CD-ROM or other optical disk storage; and/or magnetic disk storage or other magnetic storage devices. Such storage media may store information in the form of instructions or data structures that can be accessed by a computer. A disk and disc, as used herein, includes a compact disc (CD), a laser disc, an optical disc, a digital versatile disc (DVD), a floppy disk, and a Blu-ray Disc™ (Blu-Ray Disc Association, Universal City, Calif.), where disks usually reproduce data magnetically, while discs reproduce data optically with lasers. a.

Software or instructions that are recorded on computer-readable recording media may be transmitted through transmission media. For example, if the software is transmitted from a website, a server, or other remote source by using a coaxial cable, a fiber optic cable, a twisted pair, a digital subscriber line (DSL), or a wireless technology such as an infrared, a radio, and/or a microwave, then the coaxial cable, fiber optic cable, twisted pair, DSL, or wireless technology such as infrared, radio, and/or microwave are included in the definition of transmission media.

While the inventive concept has been particularly shown and described with reference to exemplary embodiments thereof, it will be understood by those of ordinary skill in the art that various changes in form and detail may be made therein without departing from the spirit and scope of the inventive concept as defined by the following claims. The exemplary embodiments should be considered in a descriptive sense only and not for purposes of limitation. Therefore, the scope of the inventive concept is defined not by the detailed description of the inventive concept but by the appended claims, and all differences within the scope will be construed as being included in the inventive concept.

What is claimed is:

1. An ultrasound sensor comprising:
a transmitter;
a receiver; and
a controller configured to:
identify a first area in a space,
control the transmitter to simultaneously output a plurality of first ultrasound beams having different frequencies to respective first sub-areas of a plurality of first sub-areas that are included in the first area,
control the receiver to receive a first reflection signal from an object reflecting the plurality of ultrasound beams, and
identify whether the object is included in each of the plurality of first sub-areas, based on the first reflection signal.

2. The ultrasound sensor of claim 1, wherein the transmitter comprises a plurality of output elements and the controller is configured to:
control a first output element from among the plurality of output elements to output an ultrasound beam for identifying the first area,
control the receiver to receive a reflection signal for identifying the first area from the object reflecting the ultrasound beam output by the first output element,
identify a first point of the object that is closest to the first output element, based on the reflection signal for identifying the first area, and
identify the first area that includes the first point.

3. The ultrasound sensor of claim 2, wherein the controller is configured to:
control a second output element from among the plurality of output elements to output an ultrasound beam for identifying a second area,
control the receiver to receive a reflection signal for identifying the second area from the object reflecting the ultrasound beam output by the second output element,
identify a second point of the object that is closest to the second output element, based on the reflection signal for identifying the second area, and
identify the second area that includes the second point.

4. The ultrasound sensor of claim 3, wherein the controller is configured to:
control the transmitter to respectively output the plurality of first ultrasound beams to a plurality of second sub-areas that are included in the second area, and
identify whether the object is included in each of the plurality of second sub-areas, based on a reflection signal from the object reflecting the plurality of first ultrasound beams output to the plurality of second sub-areas.

5. The ultrasound sensor of claim 1, wherein the ultrasound sensor is included in an electronic device,
wherein the controller is configured to identify the first area based on a user interface (UI) that is provided by the electronic device.

6. The ultrasound sensor of claim 1, wherein the controller is configured to:
control the transmitter to output a plurality of second ultrasound beams having different frequencies to a plurality of second sub-areas that are included in the plurality of first sub-areas,
control the receiver to receive a plurality of second reflection signals from an object reflecting the plurality of second ultrasound beams, and
identify whether the object is included in each of the plurality of second sub-areas, based on the plurality of second reflection signals.

7. The ultrasound sensor of claim 6, wherein the transmitter comprises a plurality of output elements, and,
wherein a number of output elements that are used to output at least one ultrasound beam from among the plurality of first ultrasound beams is less than a number of output elements that are used to output at least one ultrasound beam from among the plurality of second ultrasound beams.

8. The ultrasound sensor of claim 6, wherein a frequency of an ultrasound beam having a highest frequency from among the plurality of first ultrasound beams is lower than a frequency of an ultrasound beam having a highest frequency from among the plurality of second ultrasound beams.

9. The ultrasound sensor of claim 1, wherein the transmitter comprises:
a pulse generator configured to generate a plurality of pulses having different frequencies corresponding to the plurality of first ultrasound beams;
a transmission delay configured to generate delayed pulses by delaying the plurality of pulses by predetermined delay times in order to determine directivities of the plurality of first ultrasound beams; and
an output element array configured to output the plurality of first ultrasound beams based on the delayed pulses.

10. The ultrasound sensor of claim 9, wherein the transmitter comprises an output element array comprising a plurality of linearly-arranged output elements configured to vibrate according to a transmitted electrical signal transmitted thereto to generate ultrasound, and
the receiver comprises an input element array comprising a plurality of linearly-arranged input elements configured to receive the first reflection signal and convert the first reflection signal into an electrical signal,
wherein the output element array and the input element array are not parallel to each other.

11. The ultrasound sensor of claim 1, wherein the receiver is configured to receive the first reflection signal, divide the first reflection signal into signals according to frequencies, and sum signals having the same frequency from among the signals that are divided according to frequencies.

12. The ultrasound sensor of claim 11, wherein the first reflection signal comprises two reflection signals, and
wherein the receiver comprises:
an input element array comprising a first input element configured to receive one of the two reflection signals and a second input element configured to receive the other of the two reflection signals;
a filter configured to generate first divided signals by dividing the one of the two reflection signals according to different frequencies and generate second divided signals by dividing the other of the two reflection signals according to different frequencies;
a reception delay configured to generate first delayed signals by delaying reception of the first divided signals based on frequencies of the first divided signals and generate second delayed signals by delaying reception of the second divided signals based on frequencies of the second divided signals; and
a summer configured to sum signals having the same frequency from among the first delayed signals and the second delayed signals.

13. An object detecting method of an ultrasound sensor, the object detecting method comprising:
identifying a first area in a space;
simultaneously outputting a plurality of first ultrasound beams having different frequencies to respective first sub-areas of a plurality of first sub-areas that are included in the first area;
receiving a first reflection signal from an object reflecting the plurality of first ultrasound beams; and
identifying whether the object is included in each of the plurality of first sub-areas, based on the first reflection signal.

14. The object detecting method of claim 13, further comprising:
outputting a first ultrasound beam for identifying the first area, wherein the outputting is performed by a first output element configured to vibrate according to an electrical signal;
receiving a reflection signal for identifying the first area from the object reflecting the first ultrasound beam;
identifying a first point of the object that is closest to the first output element, based on the reflection signal for identifying the first area; and
identifying the first area that includes the first point.

15. The object detecting method of claim 14, further comprising:
outputting a second ultrasound beam for identifying a second area, wherein the outputting is performed by a second output element;
receiving a reflection signal for identifying the second area from the object reflecting the second ultrasound beam;
identifying a second point of the object that is closest to the second output element, based on the reflection signal for identifying the second area;
identifying the second area that includes the second point;
respectively outputting the plurality of first ultrasound beams to a plurality of second sub-areas that are included in the second area; and
determining whether the object is included in each of the plurality of second sub-areas, based on a reflection signal from the object reflecting the plurality of first ultrasound beams output to the second sub-areas.

16. The object detecting method of claim 13, further comprising:
respectively outputting the plurality of second ultrasound beams to a plurality of second sub-areas that are included in the plurality of first sub-areas;
receiving a second reflection signal from the object reflecting the plurality of second ultrasound beams; and
identifying whether the object is included in each of the plurality of second sub-areas, based on the second reflection signal.

17. The object detecting method of claim 13, wherein the respectively outputting of the plurality of first ultrasound beams comprises:
generating a plurality of pulses having different frequencies corresponding to the plurality of first ultrasound beams;
generating delayed pulses by delaying the plurality of pulses by predetermined delay times in order to determine directivities of the plurality of first ultrasound beams; and
outputting the plurality of first ultrasound beams based on the delayed pulses.

18. The object detecting method of claim 13, further comprising:
receiving the first reflection signal;
dividing the first reflection signal into signals according to frequencies; and
summing signals having the same frequency from among the signals that are divided according to frequencies.

19. The object detecting method of claim 18, wherein the first reflection signal comprises two reflection signals,
the receiving of the first reflection signal comprises receiving the two reflection signals,
the dividing of the first reflection signal comprises generating first divided signals by dividing one of the two reflection signals according to different frequencies and generating second divided signals by dividing the other of the two reflection signals according to different frequencies, and the summing of the signals having the same frequency comprises generating first delayed signals by delaying reception of the first divided signals based on frequencies of the first divided signals, generating second delayed signals by delaying reception of the second divided signals based on frequencies of the second divided signals, and summing signals having the same frequency from among the first delayed signals and the second delayed signals.

20. A non-transitory computer-readable recording medium having embodied thereon a program which, when executed by a processor, causes the processor to:

determine a first area in a space;

control simultaneously outputting a plurality of first ultrasound beams having different frequencies to respective first sub-areas of a plurality of first sub-areas that are included in the first area;

control receiving a first reflection signal from an object reflecting the output plurality of first ultrasound beams; and identify whether the object is included in each of the plurality of first sub-areas, based on the first reflection signal.

* * * * *